(12) United States Patent
Nickerson et al.

(10) Patent No.: US 7,464,381 B1
(45) Date of Patent: Dec. 9, 2008

(54) CONTENT UPDATE PROXY METHOD

(75) Inventors: Thomas W. Nickerson, Jamaica Plain, MA (US); Robert Phillips, Hampton Falls, NH (US)

(73) Assignee: Oracle International Corporation, Redwood Shores, CA (US)

( * ) Notice: Subject to any disclaimer, the term of this patent is extended or adjusted under 35 U.S.C. 154(b) by 0 days.

(21) Appl. No.: 09/570,276

(22) Filed: May 12, 2000

(51) Int. Cl.
*G06F 3/00* (2006.01)
*G06F 9/44* (2006.01)
*G06F 9/46* (2006.01)
*G06F 13/00* (2006.01)

(52) U.S. Cl. .................. 719/311; 715/240

(58) Field of Classification Search .......... 709/203, 709/219, 218, 204, 228; 707/10; 715/523, 715/240; 345/760; 705/20, 22, 28, 29
See application file for complete search history.

(56) References Cited

U.S. PATENT DOCUMENTS

| | | | | |
|---|---|---|---|---|
| 5,727,164 A * | 3/1998 | Kaye et al. | ..................... | 705/28 |
| 5,870,544 A * | 2/1999 | Curtis | ........................ | 713/201 |
| 5,873,069 A * | 2/1999 | Reuhl et al. | .................... | 705/20 |
| 5,894,554 A * | 4/1999 | Lowery et al. | ............... | 709/203 |
| 5,945,989 A * | 8/1999 | Freishtat et al. | ............. | 345/760 |
| 6,052,730 A | 4/2000 | Felciano et al. | | |
| 6,092,074 A | 7/2000 | Rodkin et al. | | |
| 6,105,004 A * | 8/2000 | Halperin et al. | ............... | 705/28 |
| 6,122,661 A | 9/2000 | Stedman et al. | | |
| 6,226,642 B1 * | 5/2001 | Beranek et al. | ............... | 707/10 |
| 6,226,792 B1 | 5/2001 | Goiffon et al. | | |
| 6,239,797 B1 * | 5/2001 | Hills et al. | ................... | 715/784 |
| 6,263,352 B1 * | 7/2001 | Cohen | ........................ | 715/513 |
| 6,266,684 B1 * | 7/2001 | Kraus et al. | .................. | 715/513 |
| 6,308,275 B1 * | 10/2001 | Vaswani et al. | ............. | 713/201 |
| 6,323,881 B1 * | 11/2001 | Broulik et al. | ............... | 715/744 |
| 6,415,319 B1 * | 7/2002 | Ambroziak | ................. | 709/219 |
| 6,434,578 B1 * | 8/2002 | McCauley et al. | .......... | 715/517 |
| 6,438,578 B1 * | 8/2002 | Schmid et al. | ............... | 709/203 |
| 6,457,030 B1 * | 9/2002 | Adams et al. | ................ | 715/523 |
| 6,493,679 B1 * | 12/2002 | Rappaport et al. | ............ | 705/29 |
| 6,535,896 B2 * | 3/2003 | Britton et al. | ................ | 715/523 |
| 6,549,941 B1 * | 4/2003 | Jaquith et al. | ................ | 709/219 |
| 6,594,691 B1 * | 7/2003 | McCollum et al. | .......... | 709/218 |

(Continued)

OTHER PUBLICATIONS

Remote Scripting, "http://msdn.mircosoft.com/scripting/remotescripting . . . " Microsoft Corporation (Jan. 4, 2000).

(Continued)

*Primary Examiner*—Christian LaForgia
(74) *Attorney, Agent, or Firm*—Townsend and Townsend and Crew LLP

(57) ABSTRACT

A web page can be updated by communicating modification instructions to the web page from a server, through a proxy frame of the web page, such that the modification instructions affect less than the entire web page. This method avoids having to reload the content frame every time a change to content is required thus eliminating screen flash within the browser which generally accompanies navigating between similar pages from the same web site. A source frame can be used to store methods having instructions for updating the content of the web page. These methods can be invoked from the proxy frame, further reducing the amount of network traffic generated during subsequent requests for content modification instructions.

77 Claims, 22 Drawing Sheets

U.S. PATENT DOCUMENTS

| | | | |
|---|---|---|---|
| 6,601,057 B1* | 7/2003 | Underwood et al. | 707/1 |
| 6,626,958 B1* | 9/2003 | McCauley et al. | 715/517 |
| 6,668,354 B1* | 12/2003 | Chen et al. | 715/517 |
| 6,701,368 B1* | 3/2004 | Chennapragada et al. | 709/228 |
| 6,760,750 B1* | 7/2004 | Boneh et al. | 709/204 |
| 6,785,891 B1* | 8/2004 | Allen et al. | 719/313 |
| 7,035,926 B1* | 4/2006 | Cohen et al. | 709/225 |

OTHER PUBLICATIONS

Jenks, Ken, Re: "Re: JavaScript Calling CGI Script," in comp.lang. javascript, Feb. 16, 2000, downloaded from < http://groups.google.com/group/comp.lang.javascript/msg/343ea4daa298e8df?hl=en&>.

Quantz, Larry, "need help with 'merging' two html files together," in comp.lang.javascript, Feb. 6, 2000, downloaded from <http://groups.google.com/group/comp.lang.javascript/msg/1f890780cb6c22e6?hl=en&>.

Wilkinson, Bill, "Re: Response Redirect," in Microsoft.public.inetserver.asp.general, Feb. 3, 2000, downloaded from <http://groups.google.com/group/microsoft.public.inetserver.asp.general/msg/8dd026d00167fd14?hl=en&>.

Jenks, Ken, "Re: Submitting all forms within a HTML-page?" in comp.lang.javascript, Nov. 22, 1999, downloaded from <http://groups.google.com/group/comp.lang.javascript/msg/d4654b5ac56a42b2?hl=en&>.

Beilby, James, "Re: Help me I'm dumb" in comp.lang.javascript, Sep. 18, 1999, downloaded from <http://groups.google.com/group/comp.lang.javascript/msg/8e7c1ab6c5868e48?hl=en&>.

Payne, Patrick, "Re: Web Development—the future or a sideline?" in comp.lang.javascript, Aug. 23, 1999, downloaded from <http://groups.google.com/group/comp.databases.pick/msg/e55f8bb165bbec36?hl=en&>.

Zigray, David, "Web Development—the future or a sideline?—Now!" in comp.databases.pick, Aug. 25, 1999, downloaded from <http://groups.google.com/group/comp.databases.pick/msg/772b10140e56fe47?hl=en&>.

Storms, Ian A., "Re: Connecting to Database!!!" in comp.lang.javascript, Aug. 17, 1999, downloaded from <http://groups.google.com/group/comp.lang.javascript/msg/5536270d890750fc?hl=en&>.

Greenwood, Tony, "Re: Help! Passing vars between Perl and JavaScript," in comp.lang.javascript, May 18, 1999, downloaded from "http://groups.google.com/group/comp.lang.javascript/msg/d6d6e18ddd89b282?hl=en&".

Greenwood, Tony, "Re: receiving parameters," in comp.lang.javascript, Mar. 22, 1999, downloaded from <http://groups.google.com/group/comp.lang.javascript/msg/88b9dd5f7f502e0d?hl=en&>.

Greeson, Roy et al., "Is this possible with Client-Side Java?" in comp.lang.javascript, Mar. 20, 1999, downloaded from <http://groups.google.com/group/comp.lang.javascript/browse_thread/thread/3788f12a16af547f/2446b8a8bd23e1aa#2446b8a8bd23e1aa>.

Storms, Ian A., "Re: the efficiency of JavaScript Variables," in comp.lang.javascript, Jan. 25, 1999, downloaded from <http://groups.google.com/group/comp.lang.javascript/msg/5912db735c7685e8?hl=en&>.

Sigiros, Angelo, "Re: passing data: frame1>server>frame2 how???" in netscape.devs-javascript, Jan. 8, 1999, downloaded from <http://groups.google.com/group/netscape.devs-javascript/msg/921acdc6f9d30ce4?hl=en&>.

Honnen, Martin, "Re: JavaScript polling a servlet/cgi," in borland.public.intrabuilder.javascript, Oct. 9, 1998, downloaded from <http://groups.google.com/group/borland.public.intrabuilder.javascript/msg/4b70e4bc473fc93a?hl=en&>.

Zandstra, Matt, "Re: passing variables," in comp.lang.javascript, Aug. 12, 1998, downloaded from <http://groups.google.com/group/comp.lang.javascript/msg/c8f282bf26253864?hl=en&>.

Broderick, Andrew, "Re: Sub Drop Down List," in microsoft.public.vinterdev, Jul. 1, 1998, downloaded from <http://groups.google.com/group/microsoft.public.vinterdev/msg/74b1b9fafd6e9f89?hl=en&>.

Freedman, Richard, "Re: Passing complex structure (binary tree) from java to javascript," in comp.lang.javascript, Apr. 16, 1998, downloaded from <http://groups.google.com/group/comp.lang.javascript/msg/84988957fc822ec5?hl=en&>.

Valley, Thomas, "Re: Opening a URL in the background," in netscape.devs-javascript, Mar. 19, 1998, downloaded from <http://groups.google.com/group/netscape.devs-javascript/msg/72126c9d8cc41723?hl=en&>.

Segura, Alvaro, Re: Client JScript talking to Server, in comp.lang.javascript, Mar. 18, 1999, downloaded from <http://groups.google.com/group/comp.lang.javascript/msg/0afe1f53f594aa1b?hl=en&>.

Jenks, Ken, "Re: Can you call a Java Servlet through javascript?" in comp.lang.javascript, Jan. 6, 2000, downloaded from <http://groups.google.com/group/comp.lang.javascript/msg/249ef5feb780b97e?hl=en&>.

Newton, Stuart, "Re: Problem on variables—Need your help!" in microsoft.public.Inetserver.iis.activeserverpages, Jan. 12, 2000, downloaded from <http://groups.google.com/group/microsoft.public.inetserver.iis.activeserverpages/msg/45daf823b1585941?hl=en&>.

Camden, Ray, "Creating a 'Live' ColdFusion Site," *ColdFusion Developer's Journal*, Jan. 12, 1999, downloaded from <http://cfdj.sys-con.com/read/41481.htm>.

Jalix.org, "The Dynamic Duo—Cross-Browser Dynamic HTML," Nov. 11, 1999, downloaded from <http://www.jalix.org/ressources/internet/dhtml/_dynduo/dynduo-19991024.pdf>.

Schwartz, "Chapter 20—VBScript Forms, Controls, and Managing Transactions," *Special Edition Using Visual Basic Script*, QUE Corporation, 1996, downloaded from < http://www.urc.bl.ac.yu/manuals/vbscript/ch20fi.htm>.

Baron, J., & Siepmann, M "Using web questionnaires for judgment and decision making research," in *Psychological Experiments on the Internet* (M. H. Birnbaum (Ed.) (2000), downloaded from <http://www.psych.upenn.edu/~baron/examples/baron4.htm>.

* cited by examiner

INTERACTIVE GRID

| PRODUCT | LIST PRICE | DISCOUNT | PRICE |
|---|---|---|---|
| AMX32301 | 200.00 | 0 | 200.00 |
| AMX32301 | 200.00 | 0 | 200.00 |
| AMX32301 | 200.00 | 0 | 200.00 |

TOTAL DISCOUNTED PRICE  $   600

FIG. 1A

INTERACTIVE GRID                                           1000

| PRODUCT | LIST PRICE | DISCOUNT | PRICE |
|---|---|---|---|
| AMX32301 | 200.00 | (20) | 200.00 |
| AMX32301 | 200.00 | 0 | 200.00 |
| AMX32301 | 200.00 | 0 | 200.00 |

TOTAL DISCOUNTED PRICE  $   600

FIG. 1B

INTERACTIVE GRID                                           1010

| PRODUCT | LIST PRICE | DISCOUNT | PRICE |
|---|---|---|---|
| AMX32301 | 200.00 | 20 | (180.00) |
| AMX32301 | 200.00 | 0 | 200.00 |
| AMX32301 | 200.00 | 0 | 200.00 |

TOTAL DISCOUNTED PRICE  $ (580)  1020

FIG. 1C

```
<html>
<head>
<title>New Page 1</title>
<meta name="GENERATOR" content="Microsoft FrontPage 3.0">
</head>
<frameset rows="*,0" border = "0">  ~600
    <frame name="main" src="Page2.asp" border = "0">  ~610
    <frame name="footer" scrolling="no" border="0" noresize target="main" src="regen1.asp">  ~620
    <noframes>
        <body>
        <p>This page uses frames, but your browser doesn't support them.</p>
        </body>
    </noframes>
</frameset>
</html>
```

FIG. 9

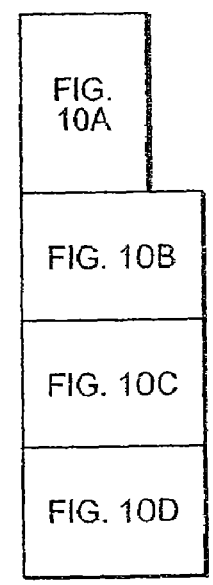

FIG. 10

```
<%@ LANGUAGE=VBScript %>
<HTML>
<HEAD>
<META NAME="GENERATOR" Content="Microsoft Visual Studio 6.0">
</HEAD>

<SCRIPT Language="JavaScript">
var glbPermission;
var numRows = 3;
var sumValue = 0;

function fnOnLoad(){
        glbPermission = true;
        calcSum();
} function calcSum() {
        var tmpPrice;var k = -1;sumValue= 0;
        for (i=0; i<numRows;i++){
                k = k + 2;
                tmpPrice = document.Zero.elements[k].value * 1;
                sumValue = sumValue + tmpPrice;
        }
        document.forms[0].sum1.value = sumValue;
} function PopulateGrid(nFrame,nForm,nElement,iDisc,iPrice){
        document.forms[nForm].elements[nElement].value = iDisc;
        document.forms[nForm].elements[nElement + 1].value = iPrice;
        calcSum();
        glbPermission = true;
}                                                                     ─700 function EventSubmit(nFrame,nForm,nElement,iList,iDisc){
        if (glbPermission == true){
                glbPermission = false;
                parent.frames[1].ClientSubmit(nFrame,nForm,nElement,iList,iDisc);
        }                                                              ─710
}                                                           720
```

FIG. 10A

```
</SCRIPT>
<BODY bgcolor="darkblue" language=JavaScript onload="return fnOnLoad()" style="BACKGROUND-COLOR: darkblue">
<FORM name=Zero>
<P><STRONG><FONT color=#daa520>Interactive Grid</FONT></STRONG></P>
<TABLE bgColor=#4682b4 border=1 cellPadding=1 cellSpacing=1 width=477 height=126 style="HEIGHT: 126px; WIDTH: 477px" background=""
    borderColor=#6495ed borderColorDark=#add8e6 borderColorLight=#6495ed>
  <TR>
    <TD align=middle borderColor=#a9a9a9 width=100>Product
    <TD align=middle borderColor=#a9a9a9 width=120>List Price
    <TD align=middle borderColor=#a9a9a9 width=100>Discount
    <TD align=middle borderColor=#add8e6 width=120>Price <TR bgColor=cadetblue>
```

FIG. 10B

```
<TD align=middle borderColor=#a9a9a9>AMX32301
<TD align=middle borderColor=#a9a9a9 width=120>200.00
<TD align=middle borderColor=#a9a9a9 style="BACKGROUND-COLOR: tan">
    <INPUT id=discount1 name=discount1 onBlur=EventSubmit(0,0,0,200.00,document.Zero.discount1.value); ─730'
    style="BACKGROUND-COLOR: tan; BORDER-BOTTOM-STYLE: none; BORDER-LEFT-STYLE: none;
BORDER-RIGHT-STYLE: none; BORDER-TOP: thin; HEIGHT: 18px; TEXT-ALIGN: center; WIDTH: 100px" value=0>
<TD align=middle borderColor=#a9a9a9>
    <INPUT id=price1 name=price1 style="BACKGROUND-COLOR: cadetblue; BORDER-BOTTOM-STYLE: none;
BORDER-LEFT-STYLE: none; BORDER-RIGHT-STYLE: none; BORDER-TOP: thin; HEIGHT: 18px; TEXT-ALIGN: center;
VISIBILITY: visible; WIDTH: 149px" value=200.00 accessKey="" >

<TR bgColor=lightseagreen>
<TD align=middle borderColor=#a9a9a9>AMX32301
<TD align=middle borderColor=#a9a9a9 width=120>200.00
<TD align=middle borderColor=#a9a9a9 style="BACKGROUND-COLOR: burlywood">
    <INPUT id=discount2 name=discount2 onBlur=EventSubmit(0,0,2,200.00,document.Zero.discount2.value); ─730"
    style="BACKGROUND-COLOR: burlywood; BORDER-BOTTOM-STYLE: none; BORDER-LEFT-STYLE: none;
BORDER-RIGHT-STYLE: none; BORDER-TOP: thin; HEIGHT: 18px; TEXT-ALIGN: center; WIDTH: 100px" value=0>
<TD align=middle borderColor=#a9a9a9 style="BACKGROUND-COLOR: lightseagreen">
    <INPUT id=price2 name=price2 style="BACKGROUND-COLOR: lightseagreen; BORDER-BOTTOM-STYLE: none;
BORDER-LEFT-STYLE: none; BORDER-RIGHT-STYLE: none; BORDER-TOP: thin; HEIGHT: 18px; TEXT-ALIGN: center;
WIDTH: 149px" value=200.00>
```

FIG. 10C

```
<TR bgColor=cadetblue>
    <TD align=middle borderColor=#a9a9a9>AMX32301
    <TD align=middle borderColor=#a9a9a9 width=120>200.00
    <TD align=middle borderColor=#a9a9a9 style="BACKGROUND-COLOR: tan" >
        <INPUT id=discount3 name=discount3 onBlur=EventSubmit(0,0,4,200.00,document.Zero.discount3.value);  ⎯730"
        style="BACKGROUND-COLOR: tan; BORDER-BOTTOM-STYLE: none; BORDER-LEFT-STYLE: none;
        BORDER-RIGHT-STYLE: none; BORDER-TOP: thin; HEIGHT: 18px; LEFT: 0px; TEXT-ALIGN: center; TOP: 1px;
        WIDTH: 100px" value=0>
    <TD align=middle borderColor=#a9a9a9>
        <INPUT id=price3 name=price3 style="BACKGROUND-COLOR: cadetblue; BORDER-BOTTOM-STYLE: none;
        BORDER-LEFT-STYLE: none; BORDER-RIGHT-STYLE: none; BORDER-TOP: thin; HEIGHT: 18px; TEXT-ALIGN: center;
        WIDTH: 149px" value=200.00>

</TD></TR></TABLE>

<P><STRONG><FONT color=#00bfff><FONT color=#deb887 face="" size=3>Total Discounted Price  $ </FONT><FONT color=#deb887>
<INPUT id=sum1 name=sum1 style="BACKGROUND-COLOR: navy; BORDER-BOTTOM-STYLE: solid; BORDER-LEFT-STYLE: solid;
BORDER-RIGHT-STYLE: solid; BORDER-TOP: solid thin; COLOR: burlywood; FONT-FAMILY: sans-serif; FONT-SIZE: medium; HEIGHT: 26px;
TEXT-ALIGN: center; WIDTH: 100px" value=0>
</FONT><FONT></STRONG></P>

<P> </P>
</FORM>
</BODY>
</HTML>
```

FIG. 10D

```
<HTML>
<HEAD>
</HEAD>

<SCRIPT Language="JavaScript">

</SCRIPT>
    function WonLoad(){  } 800 function ClientSubmit(nFrame,nForm,nElement,iList,iDisc){            811
        var qString;
        qString = "?" + "T1=" + nFrame + "&T2=" + nForm + "&T3=" + nElement + "&T4=" + iList + "&T5=" + iDisc;  } 810
        document.location = "regen1.asp" + qString;   812
    }
</SCRIPT>
<BODY bgcolor="darkblue" Language = "JavaScript" onLoad="return WonLoad()";>  820
    <FORM Name="Zero">
        <P>hidden proxy page</P>
    </FORM>
</BODY>
</HTML>
```

FIG. 11A

```
<HTML>
<HEAD>
</HEAD>

<SCRIPT Language="JavaScript"> function WonLoad(){
    alert("Received data from Server!")           } 800
    parent.frames[0].PopulateGrid( 0, 0, 0, 20, 180);
} function ClientSubmit(nFrame,nForm,nElement,iList,iDisc){
    var qString;
    qString = "?" + "T1=" + nFrame + "&T2=" + nForm + "&T3=" + nElement + "&T4=" + iList + "&T5=" + iDisc;  } 810
    document.location = "regen1.asp" + qString;
}

</SCRIPT>

<BODY bgcolor="darkblue" Language = "JavaScript" onLoad="return WonLoad()";>  820
<FORM Name="Zero">
<P>hidden proxy page</P>
</FORM>
</BODY>
</HTML>
```

FIG. 11B

```
<%@ LANGUAGE=VBSCRIPT %>
<SCRIPT RUNAT=SERVER Language="JavaScript"> var rspString = 'firstPass';
                 910
if (Request.QueryString('T3') >= 0) {
    var val1 = Request.QueryString('T1');
    var val2 = Request.QueryString('T2');
    var val3 = Request.QueryString('T3');      } 920
    var val4 = Request.QueryString('T4');
    var val5 = Request.QueryString('T5');

//this is where Server side functions take place
    var newListPrice;
    newListPrice = val4 - val5;                } 930
    rspString = newListPrice;
    //this is where Server side functions take place
} var Header = '<HTML><HEAD></HEAD>';
var Body = '<BODY bgcolor="darkblue" Language = "JavaScript" onLoad="return WonLoad()";><FORM Name="Zero"><P>hidden proxy page</P>';
var Content = '';
var Trailer = '</FORM></BODY></HTML>';

</SCRIPT>
<%
Dim Script
```

| FIG. 12A |
|----------|
| FIG. 12B |

```
Script = Script & "function WonLoad(){" & chr(10)
if not rspString = "firstPass" then
    "Script = Script & "alert(""Received data from Server!"")" & chr(10)
    Script = Script & "parent.frames[0].PopulateGrid(" & val1 & "," & val2 & "," & val3 & "," & val5 & ", " & rspString & ");" & chr(10)
end if
Script = Script & "}" & chr(10)
```

940

```
Script = Script & "function ClientSubmit(nFrame,nForm,nElement,iList,iDisc){" & chr(10)
Script = Script & "var qString;" & chr(10)
Script = Script & "qString = ""0="" + ""T1="" + nFrame + ""&T2="" + nForm + ""&T3="" + nElement + ""&T4="" + iList + ""&T5="" + iDisc;" & chr(10)
Script = Script & "document.location = ""regen1.asp"" + qString;" & chr(10)
Script = Script & "}" & chr(10)
%>
```

950

```
<%= Header & "<SCRIPT Language=""JavaScript"">" & Script & "</SCRIPT>" & Body & Content & Trailer %>
```

FIG. 12B

```
<HTML>
<HEAD>
</HEAD>

<SCRIPT Language="JavaScript">
    function WonLoad(){} ─ 800
</SCRIPT>
                        831
<BODY bgcolor="darkblue"Language = "JavaScript" onLoad="return WonLoad()";> ─ 820
<FORM ACTION="regen1.asp" METHOD="POST" Name="Zero">
    <P>hidden proxy page</P>   ─ 832
    // Definition of Form Elements
        <p><input type="text" name="T5" value=0 size="20"></p>
        <p><input type="text" name="T5" value=0 size="20"></p>
        <p><input type="text" name="T5" value=0 size="20"></p>
        <p><input type="text" name="T5" value=0 size="20"></p>
        <p><input type="text" name="T5" value=0 size="20"></p>
    //End Definition
</FORM>
</BODY>
</HTML>
```

FIG. 14A

```
function EventSubmit(nFrame,nForm,nElement,iList,iDisc){
    if (glbPermission == true){
        glbPermission = false;
        parent.frames[1].document.Zero.T1.value=nFrame;
        parent.frames[1].document.Zero.T2.value=nForm;
        parent.frames[1].document.Zero.T3.value=nElement;
        parent.frames[1].document.Zero.T4.value=iList;
        parent.frames[1].document.Zero.T5.value=iDisc;
        parent.frames[1].document.Zero.submit();
    }
}
```

FIG. 14B

CONTENT UPDATE PROXY METHOD

BACKGROUND

The Internet includes a vast collection of web sites offering information, entertainment, and e-commerce services. Each web site is a compilation of interrelated web pages that are served upon request to client computer systems executing web browsing software applications, such as web browsers. Web browsers can be utilized by Internet users to view these web pages.

A web page consists of a main document encoded in a markup language, such as HTML or XML, and may also include instructions from a scripting language, such as JavaScript. The main document may require associated files for graphics, audio, video, and scripts. Script files may be encoded in a markup language and may also include instructions from a scripting language. The main web page document and its associated files describe how a web browser should display the page content and handle events occurring therein.

A web page is requested from a web browser by its URL (Universal Resource Locator). A URL is an address identifying the location of a resource, such as the main web page document or any of the associated files. The requested document or file is subsequently retrieved and transmitted back to the requesting browser. Some requested documents, such as ACTIVE SERVER PAGES scripts, require additional processing by the web server prior to transmission. This processing may include executing server-side scripting instructions for generating a customized web page document or script file.

After the main web page document is transmitted, the web browser loads the document into its display window. During the loading process, the browser issues further requests to the web server whenever the received document references an associated file by its URL. The result is multimedia content being displayed through the browser window providing information, entertainment, or e-commerce services.

Some web pages, as displayed in a browser, are divided into frames which are individual window components. Each frame can be associated with a different URL displaying content described by its corresponding script file. For example, a web page may consist of three frames, such that one frame displays a table of contents including hyperlinks to various chapters of a book, a second frame displays the contents of the chapter selected from the first frame, and a third frame displays an advertising banner. Use of frames in this manner provides a way organizing and displaying content from different sources. In addition, static content from a web site which is unchanging can be grouped into frames that are not updated regularly, while other frames can hold the content that is dynamic between pages.

SUMMARY

A problem inherent with current web browsers involves how web pages are loaded. In general, whenever a user navigates from one web page to another, the content previously displayed is cleared, such that the browser window or frame within the browser displays a white background. Once the new page is loaded from the server, the white background is replaced with the new content described by the web page.

This may be acceptable when the user is navigating between two different web sites. But even when subsequent web pages requested from the same web site are not substantially different, the entire web page content is still downloaded from the web server for display to the user. This results in unnecessary network traffic and, at the browser, the browser window appears to flash annoying the user. What is needed is a more seamless approach to updating browser windows.

One method involves the embedding of a Java applet within a web page to communicate content changes between a web server and the window or frame in which it is located. JAVA applets are programs written in the JAVA programming language that can be executed by a web browser. However, there are several limitations to this technology that raise concern about the viability of JAVA applets as a solution.

First, there is concern about network security, especially unauthorized access to a computer system, when JAVA applets are allowed to execute. Some Information Technology managers refuse to allow JAVA applets through their network firewalls, which guard against external threats from other networks, such as hackers. OCX and ACTIVE X controls exhibit the same security concerns.

Another issue regarding JAVA applets is related to the JAVA virtual machine, which is required to execute Java applets and is installed in the client computer. The JAVA virtual machine may be replaced with another version installed separately by a user or as part of another application installation. This installed version may not be compatible with the code of the JAVA applet preventing the applet from functioning properly.

Furthermore, even if the JAVA virtual machine is the correct version, the user must wait for it to initiate before executing any JAVA applet code. Therefore, the use of JAVA applets have an inherent latency particularly when utilized on slow computers.

Embodiments of the present invention provide a method of updating a web page by communicating content modifications to a content frame, issued from a server, through a proxy frame. This method can avoid having to reload the content frame every time a change to content is required.

The content frame can request the modifications from the server by invoking a proxy method defined in a script associated with the proxy frame. The proxy method may then generate and submit the request to the web server, which may in turn generate the content modification for the content frame.

The web server transmits the content modifications within a script that replaces the original script of the proxy frame. The proxy script is loaded into the proxy frame containing instructions on how to update the content frame. Upon a successful load of the proxy script, the browser executes the instructions updating the content of the content frame.

This method is generally implemented over a data transmission medium, such as a public switched communication network like the Internet. But the method may also be implemented on the same system, such as a kiosk.

Advantages of these embodiments include (1) the elimination of flashing which generally accompanies navigating between similar pages from the same web site; (2) reduced data traffic because the transmission of entire content scripts is avoided; and (3) no firewall concerns.

In particular, embodiments of the content update proxy method may include updating the displayed content of a web page by communicating modification instructions to a web page from a server through a proxy frame of the web page, where the modification instructions affect less than the entire web page. A frame may request the modification instructions from the server by invoking a method of the proxy frame (i.e. proxy method) that may generate and submit the request to the server. The frame requesting the content modifications may be a content frame. The proxy frame may receive the modification instructions from the server such that the modification instructions are represented in a script for updating the content of the web page. The script of the proxy frame may be executed to update the web page. Communicating of the modification instructions between the server and the proxy frame may include transferring data over a data transmission medium. The data transmission medium may be a public access switched communications network.

In more detail, embodiments of updating the displayed content of a web page may include (1) displaying a web page such that the web page may include a proxy frame; (2) transmitting a request from the proxy frame for a proxy script comprising a set of instructions to cause a modification to the web page; (3) transmitting the proxy script from a server into the proxy frame; (4) loading into the proxy script, which may include instructions to update the web page with the modifications, into the proxy frame; and (4) executing the proxy script to update the content of the web page with the modification. These modification instructions for updating the web page may include a command that modifies a property of a content element of the web page. Alternatively, these modification instructions for updating the web page may include a call to a method in a script of the web page. These instructions may also include commands to spawn a new instance of a browser window, redirect a frame of a web page to a new URL, rewrite an entire frame of the web page, or store global data in the web page.

In one embodiment, the request generated by the proxy method of the proxy frame may include generating a query string by the proxy frame such that the query string may include information for generating the proxy script. This information may be provided by a content frame. The query string may subsequently be transmitted to the server as a request for the proxy script. The proxy frame method which generates and transmits the query string to the server may be invoked from an event handler of the content frame in response to an event which invokes the event handler. The event may be triggered by a user interaction occurring within the content frame, server action, timer, or a third party action. In response to the request transmitted from the proxy frame, the web server scripting engine generates the proxy script which may include instructions that modifies less than the entire region of the web page.

Alternatively, the transmitting of the request for content modification may include posting data to the server. Posting includes generating a form in the proxy frame that contains a form element for storing a value. The value of the form element is set with data obtained from the web page. The form is then submitted to the server such that the value of the form element, such as text area, is transmitted to the server. The transmitted data is used to generate an appropriate proxy script with content modification instructions for updating the web page. The advantage of posting with a text area form element is that there is no size limitation imposed on the data transmitted within the request.

A further embodiment of the content proxy update includes a source frame. The source frame of a web page includes methods that can be invoked by the proxy frame for updating the content of the web page. The invoked methods execute the instructions updating the content of the web page. This has the advantage of further reduction of network traffic during subsequent requests for web page content modification.

BRIEF DESCRIPTION OF THE DRAWINGS

The foregoing and other objects, features and advantages of the content update proxy method will be apparent from the following more particular description of embodiments, as illustrated in the accompanying drawings in which like reference characters refer to the same parts throughout the different views. Emphasis in the drawings is placed on illustrating the principles of the invention.

FIG. 1A, 1B, and 1C are representations of an interactive grid in a web page used as an example to illustrate the content update proxy method. FIG. 1A illustrates the content of a web page containing an interactive grid as initially loaded from a web site. FIG. 1B illustrates an intermediate stage of the web page where a user interaction has occurred. FIG. 1C illustrates the resulting content of the web page containing the interactive grid after generation and transmission from the web server.

FIG. 9 provides a sample script of the main HTML document for the web page containing the interactive grid implementing an embodiment of the content update method.

FIG. 10, 10A, 10B, 10C, and 10D provide sample script of the content frame providing the instructions for displaying the interactive grid and for handling an event requiring a modification to its displayed multimedia content according to one embodiment.

FIG. 11A provides a sample script of the proxy frame initially as loaded from the web server containing a proxy method according to one embodiment.

FIG. 11B provides a sample script of the proxy frame containing the modification instructions from the web server according to one embodiment.

FIG. 12, 12A, and 12B provide a sample ACTIVE SERVER PAGE scripting engine implementing the web server scripting engine that generates the scripts for the proxy frame according to one embodiment.

FIG. 14A provides a sample script of the proxy frame implementing the "POST" method as initially loaded from a web server according to one embodiment.

FIG. 14B provides a portion of the sample script of the content frame from FIG. 10A illustrating how the event handler can be modified to communicate with a proxy frame implementing the "POST" method according to one embodiment.

DETAILED DESCRIPTION

Figure 2:
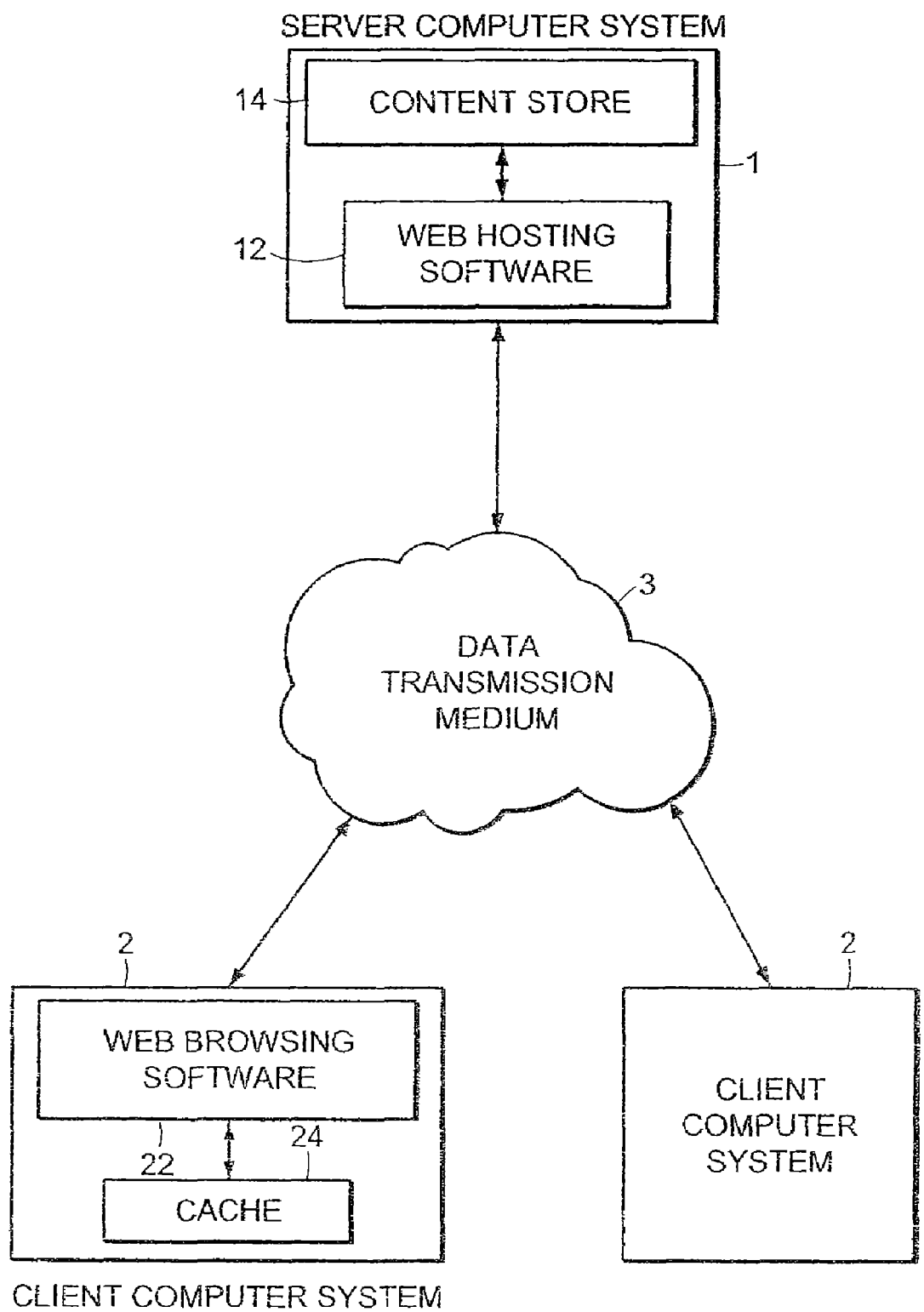
FIG. 2 is a block diagram illustrating the context in which the content update proxy method is implemented according to one embodiment.

Embodiments of the content update proxy method update the content of a web page, while avoiding the need to reload the page in its entirety. The result is the elimination of screen flash within the browser window and the reduction of network traffic.

FIG. 1A, 1B, and 1C are used to illustrate the problem of screen flash inherent within most web browsers. FIG. 1A illustrates the content of a web page containing an interactive grid as initially loaded from a web site. The grid calculates the discounted price of an item as well as the total discounted price for all items specified. The calculation occurs in response to a discount being changed for an item.

FIG. 1B illustrates an intermediate stage of the web page where a user interaction has occurred. In particular, the discount for the first item is changed from $0 to $20 at 1000. This change requires communication with the web server to compute the new price for the item and the total discounted price. Furthermore, these calculated values must be incorporated into a new web page by the server and subsequently loaded into the browser window for display. FIG. 1C illustrates the resulting content of the web page containing the interactive grid after generation and transmission from the web server.

Any communication with a web server that requests a new page, however, causes the previously displayed content to be erased. This erasing of the previous content causes the browser window or frame containing the previous content to momentarily display a white background until the new page is loaded. Therefore, the browser window or frame containing the interactive grid appears to flash, disrupting the continuity of subsequently displayed web pages and annoying the user.

The content update proxy method eliminates this bulk downloading and resulting screen flash through a particular use of browser-supported objects called frames. Frames are individual window components typically used to divide a browser window displaying different content.

The content update proxy method, however, uses frames in a fundamentally different way. In one embodiment, one frame (i.e. "content frame") displays the multimedia content, while another frame (i.e. "proxy frame") acts on behalf of the content frame communicating modifications to the content frame from a web server. Frames are associated with scripts that do not have the same capabilities as JAVA applets, thus the risk of network security breaches is eliminated. Additionally, there is no latency involved using JAVA SCRIPT programs, as there is with the waiting for the JAVA virtual machine to start up.

Whenever an event occurs that requires an update of less than the entire region of the content frame, the content frame communicates with the proxy frame to request modification instructions from the web server. The proxy frame in turn requests these modification instructions from the web server. In response, the web server generates and transmits an script file (i.e. proxy script) containing instructions for modifying the multimedia content of the content frame. This document is then loaded into the proxy frame and subsequently executed such that the multimedia content of the content frame is updated and modified. By having the proxy frame handle this communication with the server and perform the modifications to the content frame, the content frame avoids having to download and/or redisplay the page in its entirety, inhibiting screen flash from occurring.

The content update proxy method also results in reduced network traffic being produced between subsequent web page requests because less data is exchanged, particularly if there is a large amount of code required to generate the content of the web page. Reduction of network traffic is particularly noticeable when the user is connecting to the Internet over a slow modem link connection. The content update proxy method also causes the interaction with the web site to be faster because the entire page does not need to be redisplayed every time a minor modification to the page content is required.

With reference to the interactive grid example implementing the content update proxy method, the grid is displayed in the content frame with the proxy frame hidden from view. When the user interacts with the grid changing the value of one of the item discounts at 1000 in FIG. 1B, the content frame requests modification instructions through the proxy frame. Typically, this communication is accomplished by invoking a method of the proxy frame (i.e. proxy method). The proxy frame communicates this request to the web server, typically by generating and submitting a query string indicating the current state of the content (i.e. the modified discount cell and its user-modified value). In response, the web server generates and transmits the proxy script which is loaded into the proxy frame. Once loaded, the proxy frame modifies the interactive grid display as directed by the proxy script. Referring to FIG. 1C, the content is updated such that the price of the first item is changed from $200 to $180 at 1010 and the total discounted price is recalculated from $600 to $580 at 1020. As can be seen, the content frame is updated and modified without having to reload the content that did not change.

It should be noted that the proxy frame is not solely limited to modifying the content of the content frame. Where the web page includes additional frames displaying content, the proxy frame may receive and execute instructions for modifying the content in those frames in addition to the content frame. The proxy frame may also cause additional windows, such as pop-up windows, to be launched as directed by the proxy script transmitted from the server. A proxy frame can also be used to modify content of a web page such as form elements, rewrite entire individual frames, and redirect the URL of any frame to another URL. In addition, the proxy frame can spawn new instances of browser windows which the proxy frame can write to or redirect to another URL. The proxy frame can also store global data in any global variable or scripting array of any frame or parent window. The capabilities of the proxy frame can be extended to exploit other features of its associated script file and the scripting language used to generate it.

FIG. 2 is a block diagram illustrating the context in which the content update proxy method is implemented according to one embodiment. In this client-server environment, users on a client computer system 2 view information in the form of web pages that are stored in a server computer system 1.

The server system 1 includes web hosting software 12 for serving web pages to users. Requests for web pages are handled by the web hosting software 12 interfacing with a content store 14. The content store 14 stores the files that constitute the available web pages. The content store 14 may be accessed in a local computer-readable medium, as described above. Alternatively, the content store 14 may be accessed by the web hosting software 12 remotely from a separate server system.

The client computer system 2 can include a variety of peripheral devices for displaying images/video or other information to a user and for inputting text and user commands. The client computer system 2 can be a personal computer (PC) workstation, embedded system component, handheld computer, telecommunications device or another device containing memory and a processor.

To display the web pages provided by the web server, the client computer system 2 includes web browsing software 22 that supports a scripting language, such as JavaScript scripting language, and the use of frames, such as MICROSOFT'S INTERNET EXPLORER browser version 4.0 and greater or NETSCAPE NAVIGATOR browser version 3.02 and greater. The web browser can store requested documents and associated files constituting web pages in a computer readable medium, such as in a cache 24, and can display web pages as multimedia content through the browser window on the display screen. The cache 24 may be accessed in a local computer readable medium such as a hard drive.

The client computer system 2 communicates with the server computer system 1 over a data transmission medium 3, such as a public access switched communications network (e.g. the Internet). Alternatively, the data transmission medium 3 is a private data network of authorized client and server computer systems, such as a corporate Intranet. In still another embodiment, the web browsing software 22 and the web hosting software 12 execute on the same computer system, where the transmission medium 3 is a bus.

Data is transferred between the web browser and the web server using a client-server protocol, such as HTTP (HyperText Transfer Protocol). HTTP defines a transfer protocol for carrying requests from a browser to a web server and for transporting requested resources from web servers to the requesting browser. Other variations of HTTP, such as HTTPS, may be used for providing secure communications and other transmission features. In addition, where the communication takes place over a data network, the HTTP communications are encapsulated in a network transfer protocol, such as TCP/IP. TCP/IP is the standard network transfer protocol used on the Internet.

Figure 3:
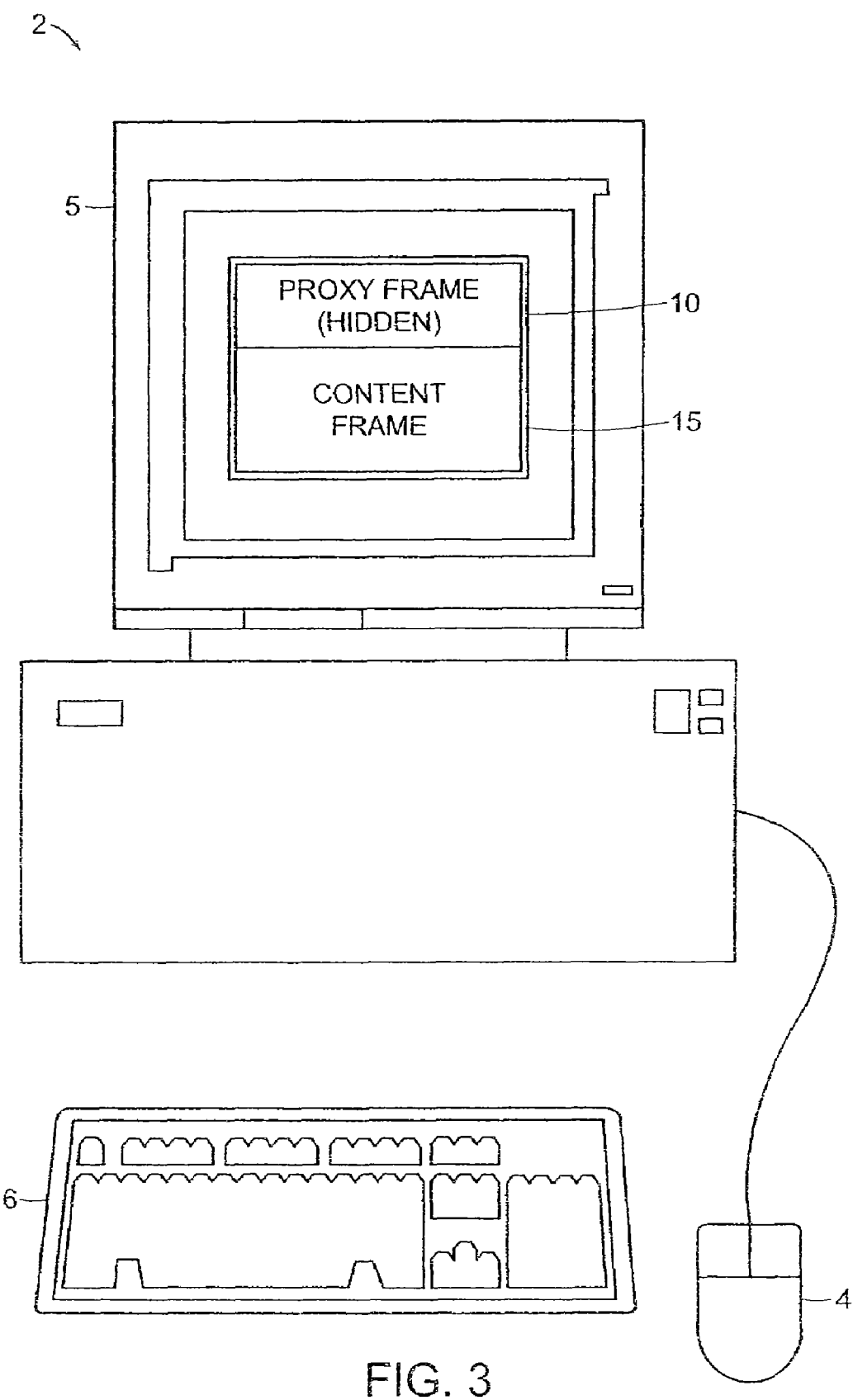
FIG. 3 illustrates a web page implementing the content update proxy method displayed through a browser of a client computer system according to one embodiment.

FIG. 3 illustrates a web page implementing the content update proxy method displayed through a browser of a client computer system 2 according to one embodiment. In particular, the web page, as shown, is divided into a content frame 15 and a proxy frame 10.

In a typical embodiment, the proxy frame 10 is hidden from view, while the content frame 15 encompasses the entire region of the browser window. The content frame 15 displays the multimedia content for user viewing and interaction. Multimedia content may include graphics, text, audio, video and other content elements such as buttons, tables, list boxes and check boxes.

The user can interact with the multimedia content via a peripheral pointing device, such as a mouse 4 or a keyboard 6. User interaction can include selecting or clicking on content elements and inputting text via the keyboard 6.

Some of these interactions may trigger events that require the displayed multimedia content to be updated such that less than the entire content frame 15 requires modification. When such an event occurs, modification instructions to the content frame are communicated from the web server 1 through the proxy frame 10. Events causing the proxy frame to request modification instructions on behalf of the content frame are alternatively triggered by timers, server actions, and actions by a third party. As an example, a user displaying a dynamic on-line activity, such as an auction, might have the browser window updated in response to the changing events, such as changing bids.

Figure 4:
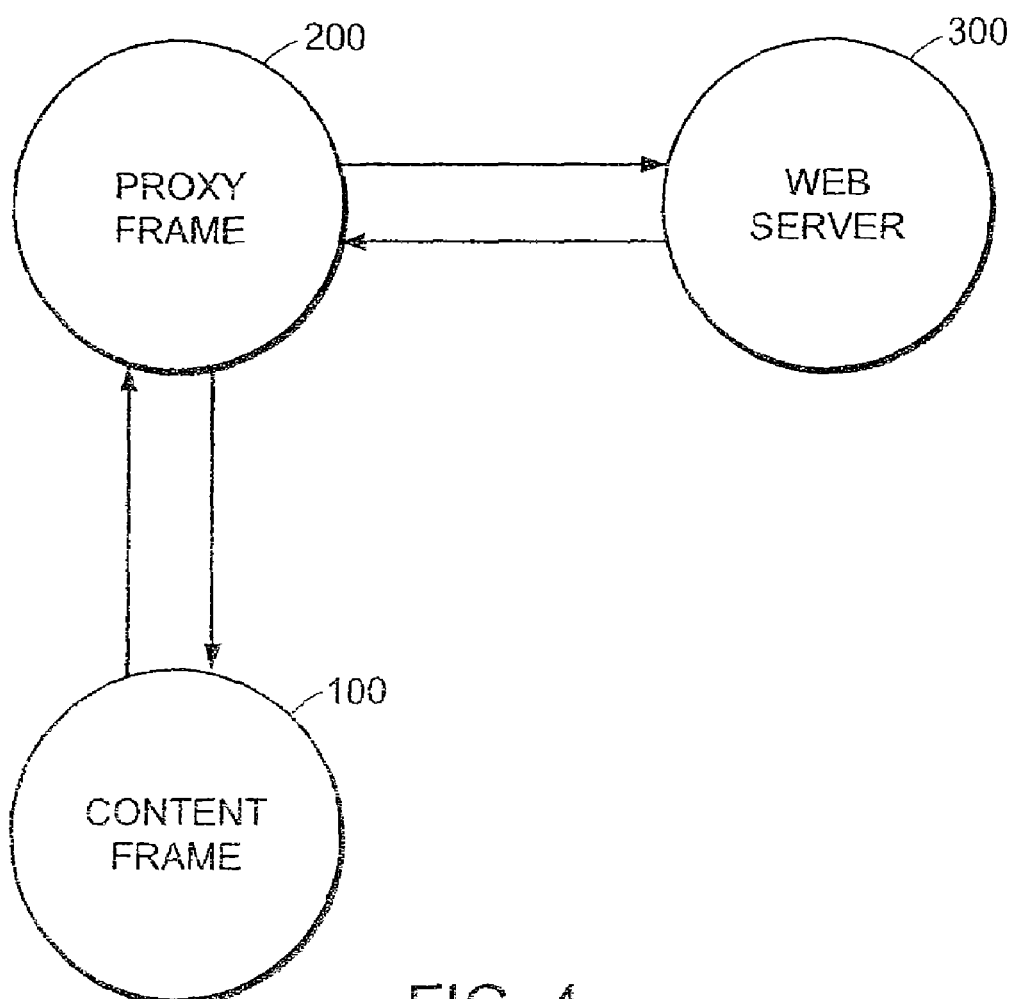
FIG. 4 is a high level object diagram illustrating the flow of communication between a content frame, a proxy frame, and a web server according to one embodiment.

FIG. 4 is a high level object diagram illustrating the flow of communication between a content frame 100, a proxy frame 200, and a web server 300 according to one embodiment. This communication flow typically occurs in response to an event requiring an update to the displayed multimedia content of the content frame.

When such an event is triggered, the content frame 100 communicates with the proxy frame 200 requesting modification instructions from the web server 300. The proxy frame 200 in turn generates and submits the request through the web browser to the web server 300. Upon receiving the request from the proxy frame 200, the web server 300 generates a new script file for the proxy frame containing the modification instructions. The web server 300 subsequently transmits the new script file back to the requesting browser which loads the proxy script into the proxy frame 200—replacing the previous script. Once successfully loaded, the modification instructions of the proxy frame 200 are executed causing the multimedia content of the content frame to be updated with the specified changes.

Figure 5:
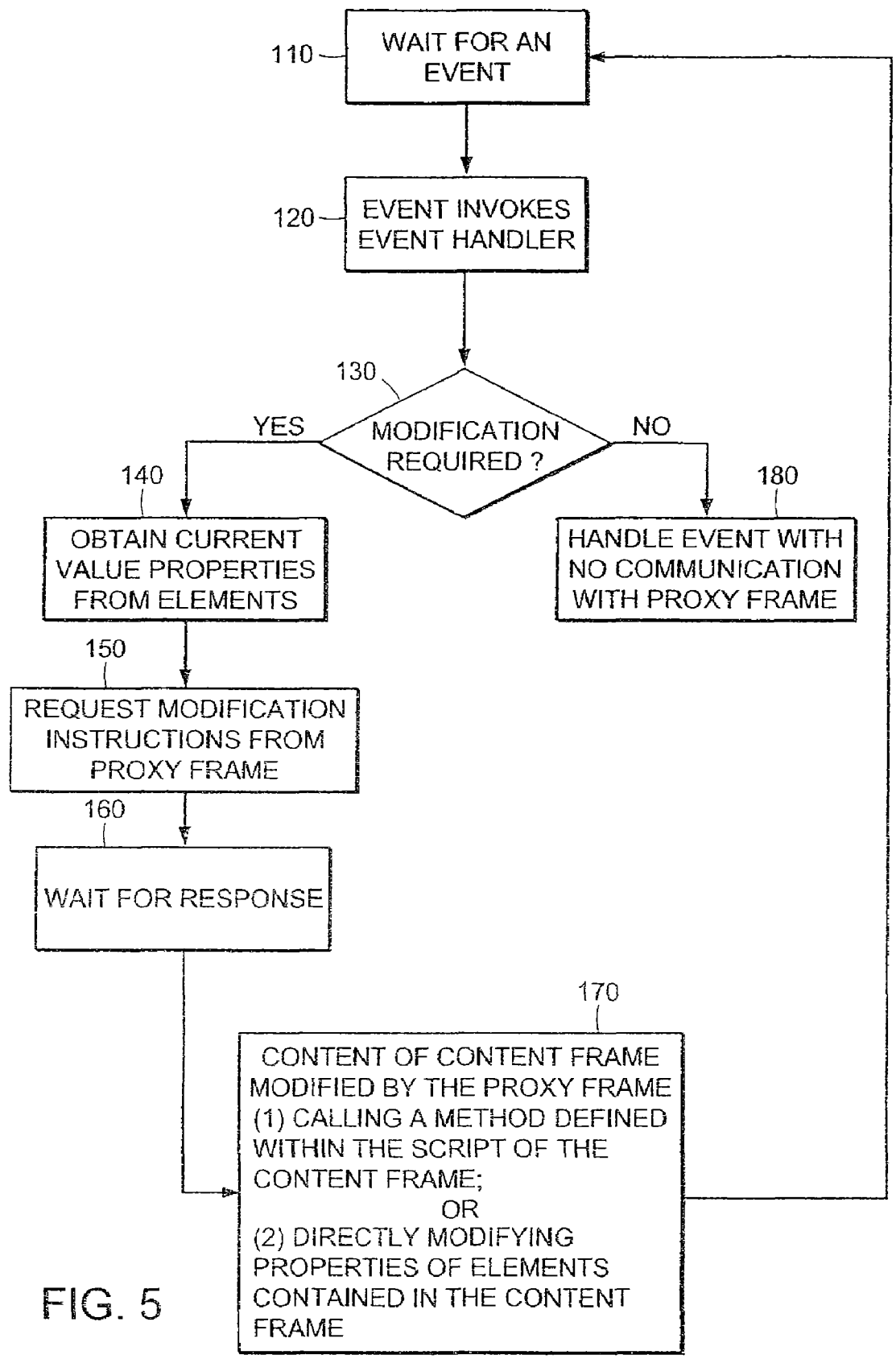
FIG. 5 is a flow diagram of a script for a content frame illustrating a process for handling an event requiring a modification to its displayed multimedia content according to one embodiment.

FIG. 5 is a flow diagram of a script for a content frame illustrating a process for handling an event requiring a modification to its displayed multimedia content according to one embodiment. The process involves communicating with a proxy frame requesting modification instructions from the web server.

At step 110, the content frame displays its content through the browser window and waits for one of its event handlers to be triggered by an event. The content frame displays its content according to the instructions provided by the script file associated with the frame 100 and initially loaded from the web server.

Upon an event occurring within the content frame, an event handler corresponding to that event is invoked at step 120. Events may be initiated through user interaction, such as a mouse click on a particular button or a selection within a list box. Alternatively, an event may be triggered by timers, server actions, and actions by a third party.

If modifications to the displayed content are required (step 130), the process proceeds to step 140 to prepare for communication with the proxy frame. Otherwise, the event is handled without any communication with the proxy frame at step 180.

At step 140, the event handler obtains information regarding the current state of the displayed content. Content elements are typically represented as objects. As such, content elements have properties representing characteristics and attributes such as color, value, and any subelements which may be read or overwritten by a script. These properties may constitute the information obtained from the displayed content. In an another embodiment, this information may be obtained prior to or simultaneously with invoking the event handler. Furthermore, when the web page includes additional frames displaying content, the content frame may obtain data from elements defined within those frames as well.

At step 150, the event handler communicates with the proxy frame requesting modification instructions. This communication may be implemented by invoking a method of the proxy frame (i.e. proxy method) defined within the proxy script of the proxy frame. In one embodiment, the proxy method is invoked with arguments retrieved from step 140.

At step 160, the content frame waits for direction from the proxy frame to update its displayed multimedia content, which are subsequently received at step 170. At step 170, the content is updated with the required modifications without having to load a new script into the content frame. In one embodiment, the proxy frame modifies the displayed content of the content frame directly by assigning new property values for specified content elements. In another embodiment, the proxy frame modifies the displayed content of the content frame indirectly by invoking one or more methods of the content frame such that the content frame executes its own instructions modifying the multimedia content itself. The proxy frame may, as specified in its updated proxy script, pass arguments to these content frame methods. By avoiding the step of loading an entire script into the content frame, the screen flash which appears due to the repainting of the browser window is eliminated.

Figure 6:
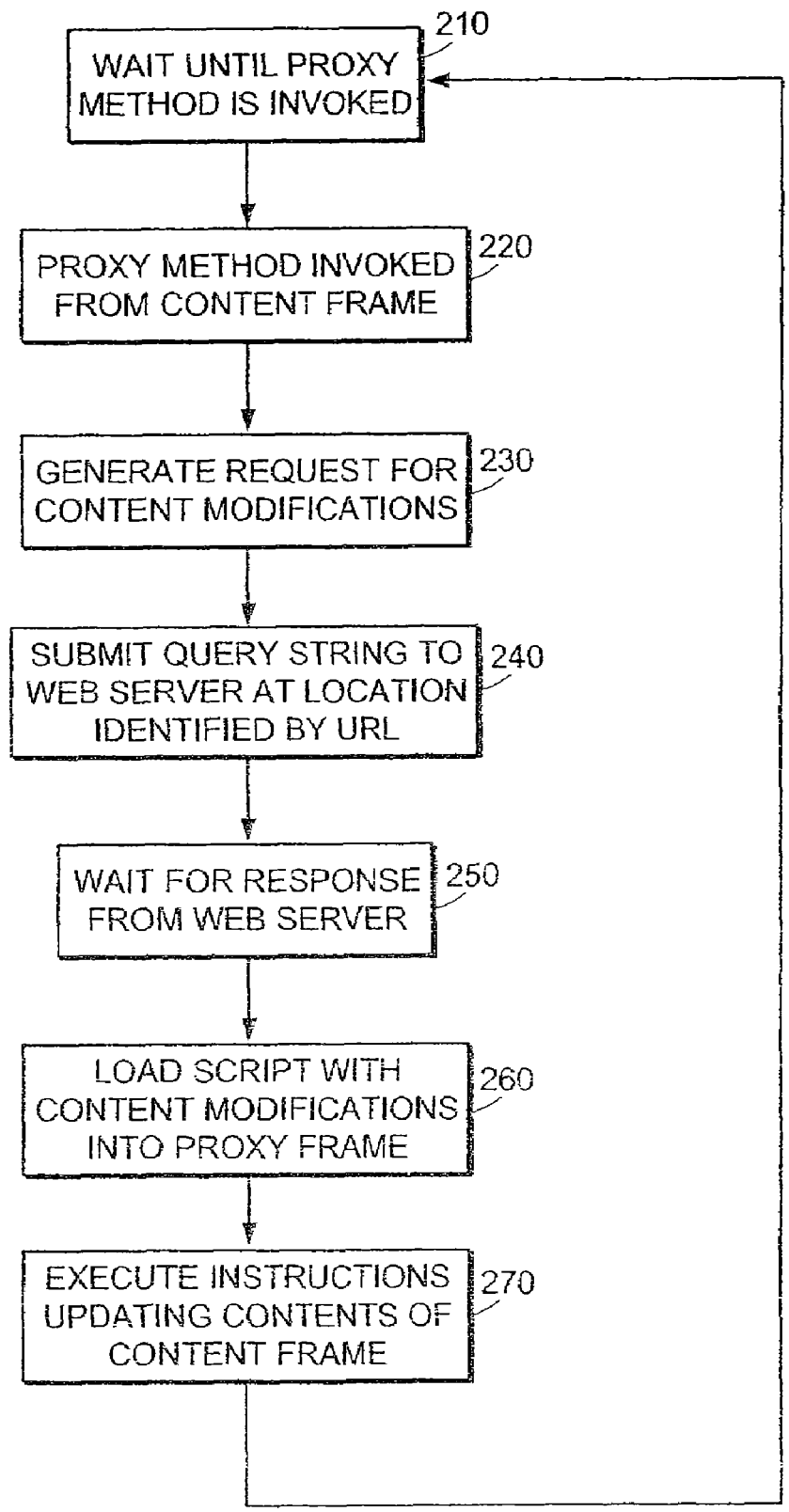
FIG. 6 is a flow diagram of a script for a proxy frame illustrating a process for handling a request for content modification according to one embodiment.

FIG. 6 is a flow diagram of a script for a proxy frame illustrating a process for handling a request for content modification according to one embodiment. In brief overview, the process may involve generating and submitting the request to the web server for content modifications and subsequently communicating those modification instructions to the content frame once received. In particular, the request for content modification, in essence, is a request for a new script to be loaded into the proxy frame.

At step 210, the proxy frame is generally hidden from view and waits until its proxy method is invoked by the content frame.

At step 220, the proxy method is invoked by the content frame. In particular, the proxy method is invoked from an event handler of the content frame as described at step 150 of FIG. 4. In one embodiment, the proxy method is passed arguments representing the current state of the displayed content of the content frame.

At step 230, the proxy method generates a request for a script file containing instructions for modifying the content of the content frame. In one embodiment, the request is generated in the form of a URL with a query string appended. A typical query string has a structure, "?field1=value1& . . . &fieldN=valueN." The questions mark (?) indicates the beginning of the query string, while the field and value pairs are separated by an ampersand (&) symbol. The query string represents the information provided as arguments to the proxy method as the field and value pairs within the query string.

At step 240, the request is submitted to a scripting engine of the web server at the location identified by the URL. In one embodiment the web server scripting engine is an ACTIVE SERVER PAGE scripting engine whose URL is requested by the proxy frame. ACTIVE SERVER PAGES (ASP) scripts are a class of script files which provide server-side scripting capabilities in addition to client-side scripting. In conjunction with supporting web hosting software, ASPs provide a web designer with the ability to transmit customized, interactive versions of HTML documents to a requesting browser. When an ASP file is requested, the web server executes any script commands embedded in the file, generates a corresponding HTML document, and sends the document to the client computer system 2. The resulting HTML document (i.e. proxy script) is used by the proxy frame to modify the multimedia content of the content frame. Alternatively, the scripting engine may be implemented with ALLAIRE'S COLD FUSION, PERL, or CGI.

The request is submitted by setting the value of the current URL to the generated URL/query string. This causes the browser to send the URL/query string in an HTTP request packet to the web server scripting engine specified by the URL.

At step 250, the proxy frame waits for an updated script from the web server. At step 260, the proxy script is received by the web browser and loaded into the proxy frame—replacing the previous script. In particular, the script contains instructions for modifying the content of the content frame, as well as a proxy method for subsequent communications between the content frame and the web server. In one embodiment, the instructions include commands that directly reassign property values of content elements. Alternatively, the instructions include a command for calling a method defined within the script of the content frame having instructions for modifying the multimedia content itself.

Upon a successful load of the proxy script, the instructions are executed to update the displayed content of the content frame with the modifications dictated by the web server at step 270. After updating the content frame, the proxy frame returns to step 210 where it waits for the proxy method to be invoked again.

Figure 7:
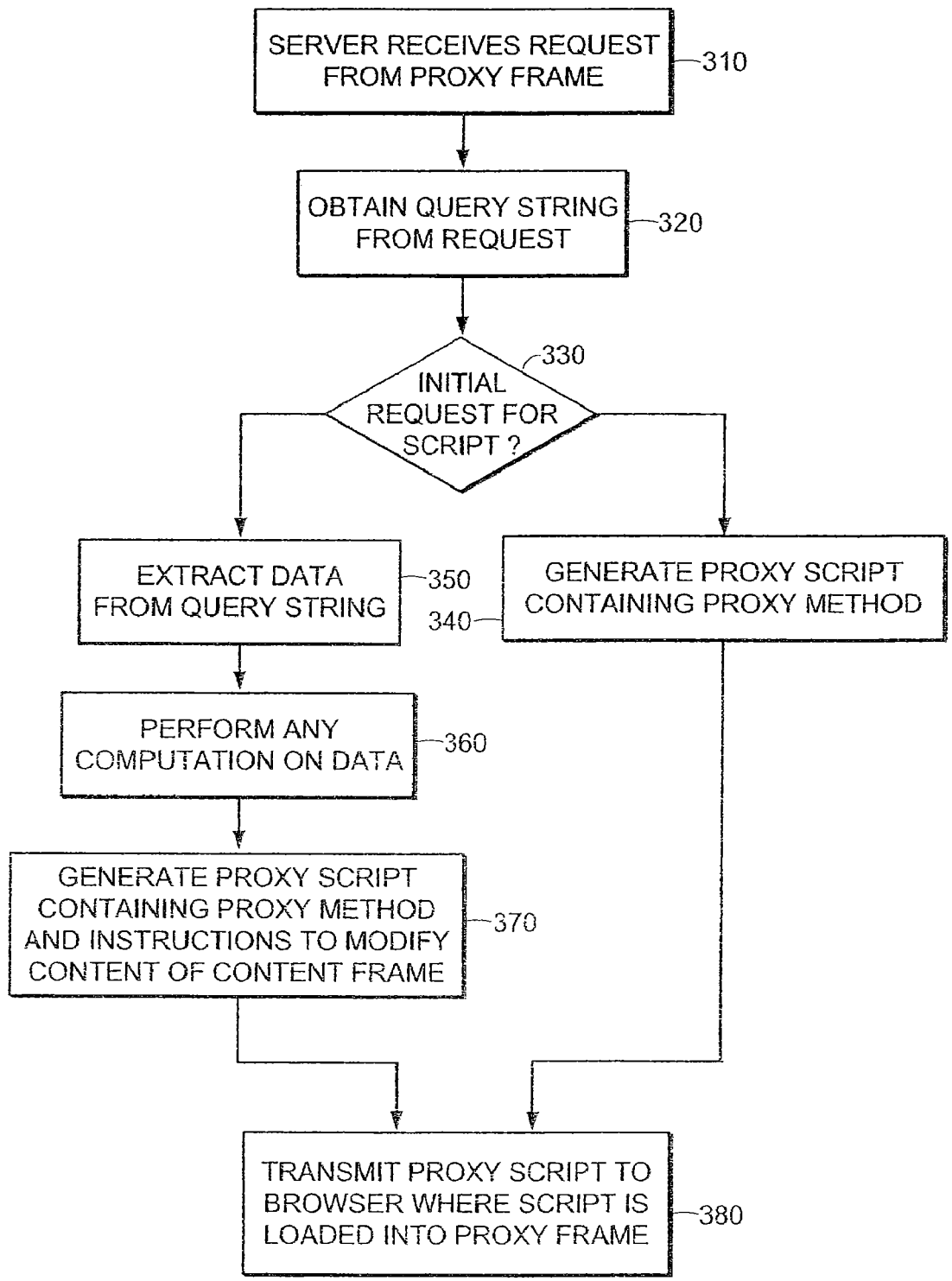
FIG. 7 is a flow diagram illustrating a process implemented by a web server scripting engine for generating a proxy script for the proxy frame containing instructions for modifying content of the content frame according to one embodiment.

FIG. 7 is a flow diagram illustrating a process implemented by a web server scripting engine for generating a proxy script for the proxy frame containing instructions for modifying content of the content frame according to one embodiment. In brief overview, the process involves determining whether the request is for an initial script for the proxy frame or whether the request is for an updated script containing instructions for modifying the content frame. In one embodiment, this determination and subsequent generation of an appropriate script is based upon the presence of data within a query string.

At step 310, the web server receives the request submitted from the proxy frame and delivers it to the specified scripting engine. In one embodiment, the web server scripting engine is an ACTIVE SERVER PAGE scripting engine containing server-side script commands for generating customized HTML documents and script files.

At step 320, the query string is obtained from the request.

At step 330, a determination is made as to whether the request is the initial request for a proxy frame script or whether the proxy frame is requesting a new script containing modifications to the content frame based on the information provided.

In one embodiment, this determination is made by determining whether the query string is NULL. If the query string is NULL, then this is the initial request for the proxy script and the scripting engine proceeds to step 340. Otherwise the query string contains data causing the engine to proceed to step 350.

When the query string is determined to be NULL, the scripting engine generates an initial proxy script containing a proxy method and no content modification instructions at step 340. The proxy method may contain instructions for generating an appropriate query string and for submitting it to a web server. In one embodiment, the query string is appended to a specified URL which is then assigned to the current URL location for the frame. Alternatively, when the query string is not NULL, the query string is parsed extracting the data at step 350.

At step 360, the scripting engine performs any necessary computation on the data, if any. The results of the computation are used in generating an appropriate proxy script.

At step 370, the scripting engine generates a proxy script containing a proxy method as well as instructions for modifying the content of the content frame. After completing either step 340 or 370, the resulting proxy script is transmitted back to the web browser where the proxy script is loaded into the proxy frame at step 380.

Figure 8:
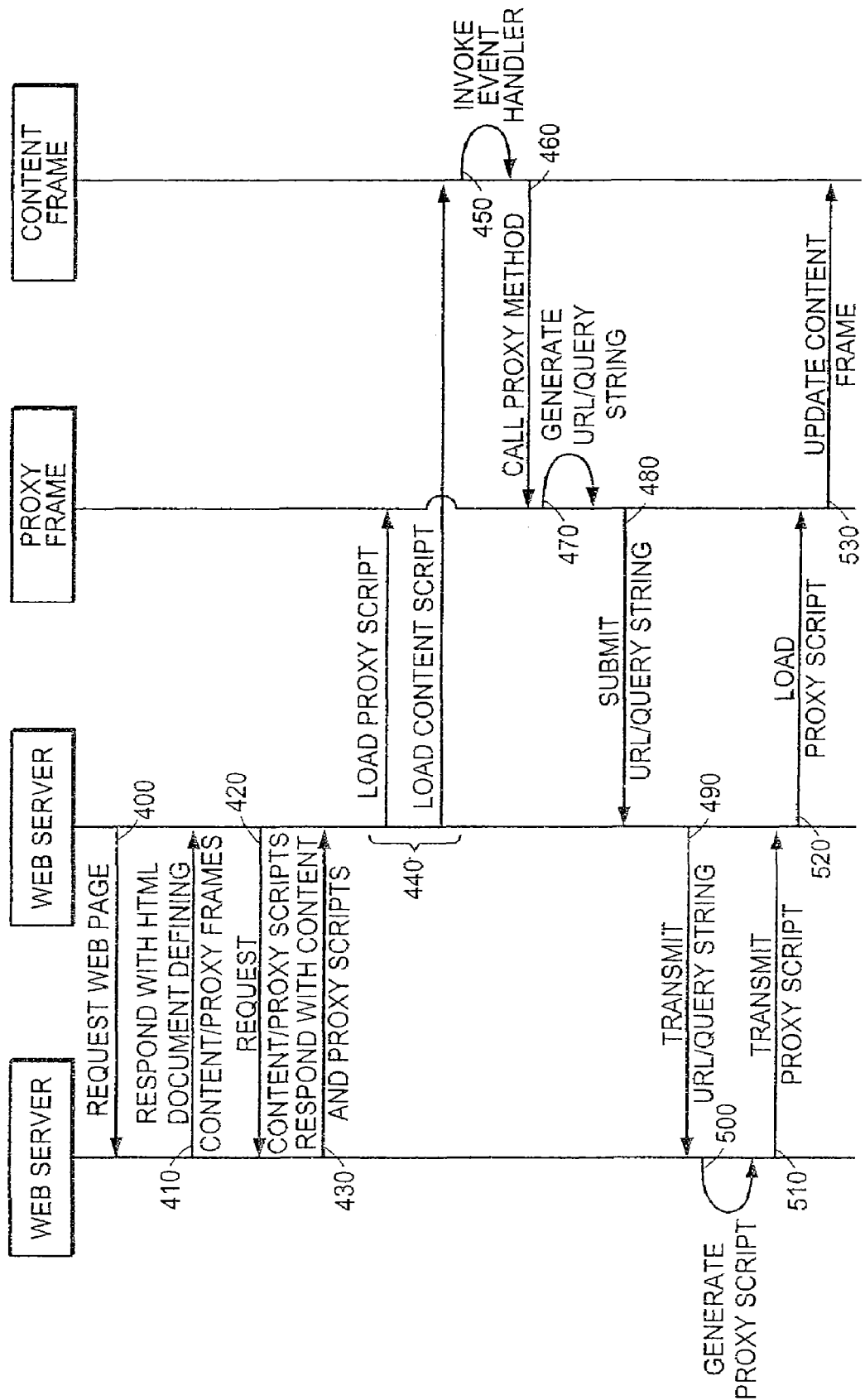
FIG. 8 is a line diagram illustrating the intercommunication between the components of the browser and server according to one embodiment.

FIG. 8 is a line diagram illustrating the intercommunication between the components of the browser and server according to one embodiment.

At step 400, the browser requests a web page from the web server by transmitting an HTTP request message. The HTTP request contains a URL string identifying a web page stored on the server. The URL string is provided by a user inputting the URL string into the browser or selecting a hyperlink associated with the referenced URL.

At step 410, the web server responds with the requested main web page document identified by the requested URL. The document written in HTML/JavaScript is stored within a cache and loaded into the browser window. The document describes a proxy frame and a content frame such that each is identified with a URL of a corresponding script file.

At step 420, the browser requests the corresponding script files for the proxy frame and the content frame. Typically, the browser generates separate HTTP requests for each script file as they are encountered within the main document.

At step 430, the web server transmits the identified script files for the proxy frame and the content frame to the web browser.

At step 440, the browser stores the scripts within a cache and loads the scripts into the corresponding frames. In a typical embodiment, the content frame displays content described in the content script, while the proxy frame remains hidden from view.

At step 450, the event handler is invoked by an event occurring within the content frame.

At step 460, the event handler calls the proxy method defined within the script of the proxy frame.

At step 470, the proxy method generates a request in the form of a URL/query string.

At step 480, the request is submitted to the web server via the web browser as an HTTP request containing the URL/query string.

At step 490, the web browser transmits the HTTP request to the web server where it is delivered to the identified URL.

At step 500, a scripting engine generates the proxy script containing instructions for modifying the content frame.

At step 510, the web server transmits the resulting proxy script back to the web browser.

At step 520, the web browser stores the updated proxy script in cache and loads it into the proxy frame replacing the previous script.

Upon a successful load, the instructions within the proxy script are executed, causing the content of the content frame to be updated with the modifications generated by the scripting engine of the web server in step 530.

The following figures provide sample scripts illustrating an implementation of the content update proxy method, following the processes described in the flow diagrams for the content frame, proxy frame, and web server scripting engine. In particular, these scripts result in the example web page representations containing the interactive grid of FIG. 1A, 1B, and 1C.

FIG. 9 provides a sample script of the main HTML document for the web page containing the interactive grid implementing an embodiment of the content update proxy method. Coded in HTML and JAVASCRIPT scripting language, the sample script, at 610, defines a content frame "main" associated with a script file identified by the URL "Page 2.asp." At 620, the proxy frame "footer" is defined and associated with a script file identified by the URL "regenl.asp." The proxy frame may be hidden from view, as illustrated at 600. By setting the height of the row encompassing the proxy frame to zero (0), the proxy frame is effectively hidden from view. The asterisk (*) indicates that the row encompassing the content frame takes up the remaining available space within the browser window.

The "asp" extension of the specified URLs indicate that the script files are ACTIVE SERVER PAGES script files. Therefore, when the browser requests these scripts for loading into their corresponding frames, the web server executes any server-side script instructions embedded in the files prior to generating and transmitting the corresponding HTML documents back to the requesting browser. In one embodiment, these ASP script files function as individual scripting engines of the web server.

FIG. 10 provides a sample script of the content frame providing the instructions for displaying the interactive grid and for handling an event requiring a modification to its displayed multimedia content according to one embodiment. This sample script of the content frame is generated from "Page2.asp" of FIG. 9. FIG. 10A provides the definitions of methods that are used in displaying of the interactive grid. In particular, the script defines an event handler "EventSubmit" at 710. When invoked, "EventSubmit" calls the proxy method "ClientSubmit" defined within the proxy script of the proxy frame at 720. The method "PopulateGrid" at 700 is called by the proxy frame to update the contents of the interactive grid with the calculated value for the discount price from the web server.

FIG. 10B, 10C and 10D provides the HTML code describing how the interactive grid is initially displayed within the content frame. In particular, the event handler "EventSubmit" is associated with blurring events occurring with the cells of the grid containing the discounts at 730', 730", and 730''' (collectively referred to as 730). A blurring event, in this example, occurs whenever a discount cell loses focus. A discount cell loses focus when a user clicks on the cell, possibly modifying the value of the cell from $0, and then clicking somewhere else. Therefore, whenever a blurring event occurs with one of these cells, "EventSubmit" is executed. At 730, the content frame obtains the property values of the related content elements (i.e. frame number, form number, discount cell number, list price cell value, discount cell value) at the time the event handler is invoked.

FIG. 11A provides a sample script of the proxy frame initially as loaded from the web server containing a proxy method according to one embodiment. This proxy script is generated from "regenl.asp." In particular, the proxy frame defines its proxy method "ClientSubmit" at 810. When invoked from the content frame, "ClientSubmit" generates the query string at 811 from the data provided by the content frame. In this case, there is no secondary calculations performed on the data prior to generating the query string. At 812, "ClientSubmit" submits the URL and appended query string for transmission to the web server. In addition, at 820, the method "WonLoad" is executed upon a successful load of this script. However, "WonLoad" is initially defined at 800 to perform no operations when executed.

FIG. 11B provides a sample script of the proxy frame containing the modification instructions from the web server according to one embodiment. The proxy script and its modification instructions are generated from "regenl.asp" by the web server. In this example, the difference is that the method "WonLoad" directs the content frame to invoke "PopulateGrid" at 800. "PopulateGrid" is invoked with arguments representing the calculated discount price value. This causes the content frame to be updated with a new discount price without having to reload the entire page.

FIG. 12 provides a sample ACTIVE SERVER PAGE scripting engine implementing the web server scripting engine that generates the scripts for the proxy frame according to one embodiment. That ASP script file is named "regenl.asp," as in FIG. 9. The scripting engine provides different scripts based on the values provided within the query string submitted by the proxy frame. In FIG. 12A, at 910, a determination is made as to whether this is an initial request for the script. This determination can be made based on whether the query string received is NULL. Alternatively, as in this example, individual field and value pairs may be tested for a valid data.

If there is valid data, the query string is parsed extracting the data into temporary variables at 920. At 930, the variables containing the list price and the discount are used in calculating the new discounted price. Referring to FIG. 12B, at 940, the method "WonLoad" which provides modification instructions for updating the content frame is generated. If this is an initial request for the script, "WonLoad" is defined with no instructions. Otherwise, "WonLoad" directs the proxy frame to invoke "PopulateGrid" of the content frame with the calculated arguments to modify the multimedia content. In FIG. 12B, at 950 the script also contains the proxy method "ClientSubmit" to handle the next modification request from the content frame.

A further embodiment of the content update proxy method addresses a limitation imposed by using the proxy method defined within the proxy script. The event handler of the content frame may alternatively communicate with the proxy frame requesting modification instructions through an approach called "posting."

There are two methods in JAVASCRIPT scripting language for submitting data to a web server, "POST" and "GET." When the GET method is used, as with the proxy method, the size of the data that can be transmitted is limited to the size of an environment variable of the web server receiving the data. The "POST" method can overcome this limitation.

Using the post method, a form is defined within a frame containing a number of form elements, such as text areas, for receiving data. In JAVASCRIPT scripting language, a form is defined using the Form object. Posting of a form causes the data stored within the form elements to be transmitted to the standard input of the receiving resource (i.e. web server scripting engine), in contrast to a receiving environment variable.

Figure 13:
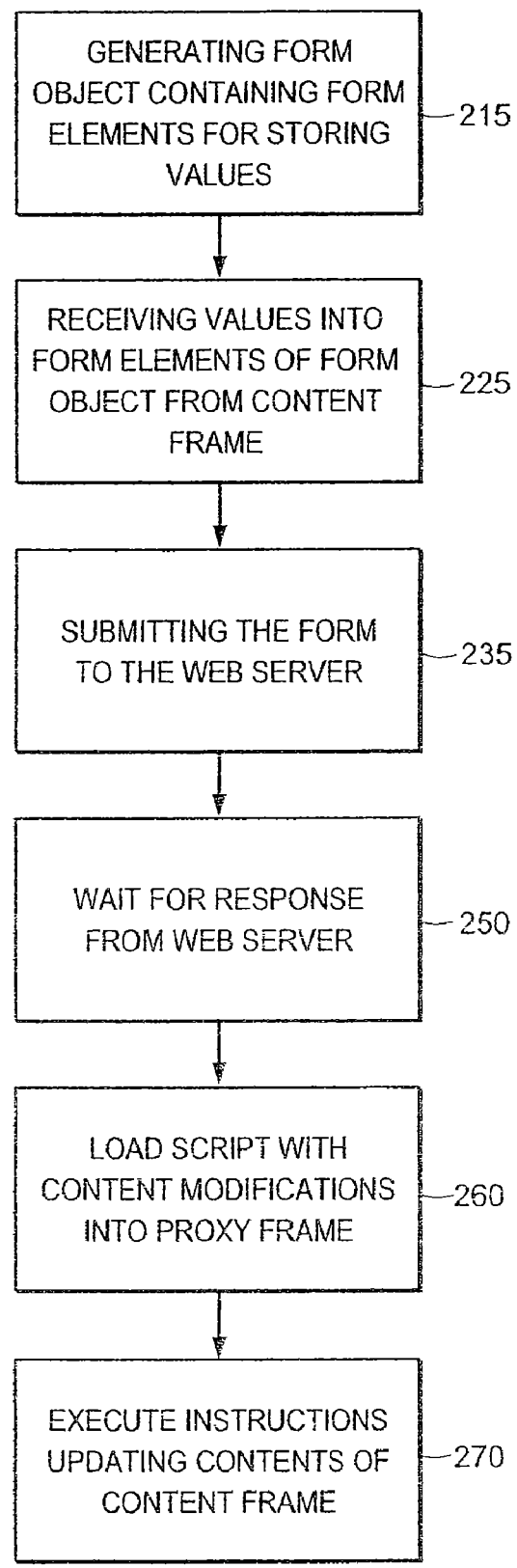
FIG. 13 is a flow diagram of a script for the proxy frame illustrating a process for handling a request for content modification using the "POST" method according to one embodiment.

FIG. 13 is a flow diagram of a script for the proxy frame illustrating a process for handling a request for content modification using the "POST" method according to one embodiment.

At step 215, the proxy frame includes a form having one or more form elements, such as a text area, for storing values.

At step 225, the form elements receive values typically set by the content frame. These values may be set with the data obtained by the content frame at step 140 of FIG. 5.

At step 235, the submit( ) method inherently provided by the form object is invoked from the event handler of the content frame. This causes the data stored within the form elements of the form object to be transmitted or "posted" to intended web server. Typically the data is submitted as a query string with the field and value pairs representing the name and value of each form element.

The remaining steps 250, 260, and 270 function in the same manner described in their counterparts in FIG. 5. The exception is that, at step 260, the generated proxy script includes a form object for posting data to the server, instead of the proxy method.

FIG. 14A provides a sample script of the proxy frame implementing the "POST" method as initially loaded from a web server according to one embodiment. In particular, the proxy script defines a form object "Zero" at 830 having five form elements. These five form elements, "T1," "T2," "T3," "T4," and "T5," are represented as text areas with their value properties initially set to zero (0) at 835. At 831, the form's ACTION attribute specifies the URL to whom the form data should be submitted. At 832, the form's METHOD attribute is set to "POST" indicating that the web server should direct the submitted form data to the standard input of the intended web server scripting engine.

FIG. 14B provides a portion of the sample script of the content frame from FIG. 10A illustrating how the event handler can be modified to communicate with a proxy frame implementing the "POST" method according to one embodiment. In particular, the event handler "EventSubmit" directly assigns values to the value properties of the text area form elements at 715. In an alternative embodiment of the posting approach, the content frame can store values in the form prior to the event handler being invoked. Once the values are set, "EventSubmit" invokes the provided "submit( )" method of the form object, "Zero" at 725. This instruction directs the proxy frame to "post" the form data to the standard input of the specified URL causing a new proxy script to be loaded into the proxy frame. The "POST" method provides the advantage of sending requests for updated scripts with the data size limitations incurred with the "GET" method of the proxy method.

As content modifications become more complex requiring a larger number of instructions to implement the content changes, the benefit of reduced network traffic associated with the content update proxy method begins to diminish. To overcome this situation, a further embodiment of the content update proxy method includes an additional frame (i.e. the source frame) providing a number of methods having the numerous instructions to the content frame and the web page in general. The script associated with the source frame which has these methods is initially loaded when its web page is requested. Therefore, instead of having to generate a proxy script having a large amount of code, the web server scripting engine can generate a smaller proxy script that references the available methods of the source frame. The invoked source frame methods in turn execute the instructions to modify the content frame and the web page in general.

Figure 15:
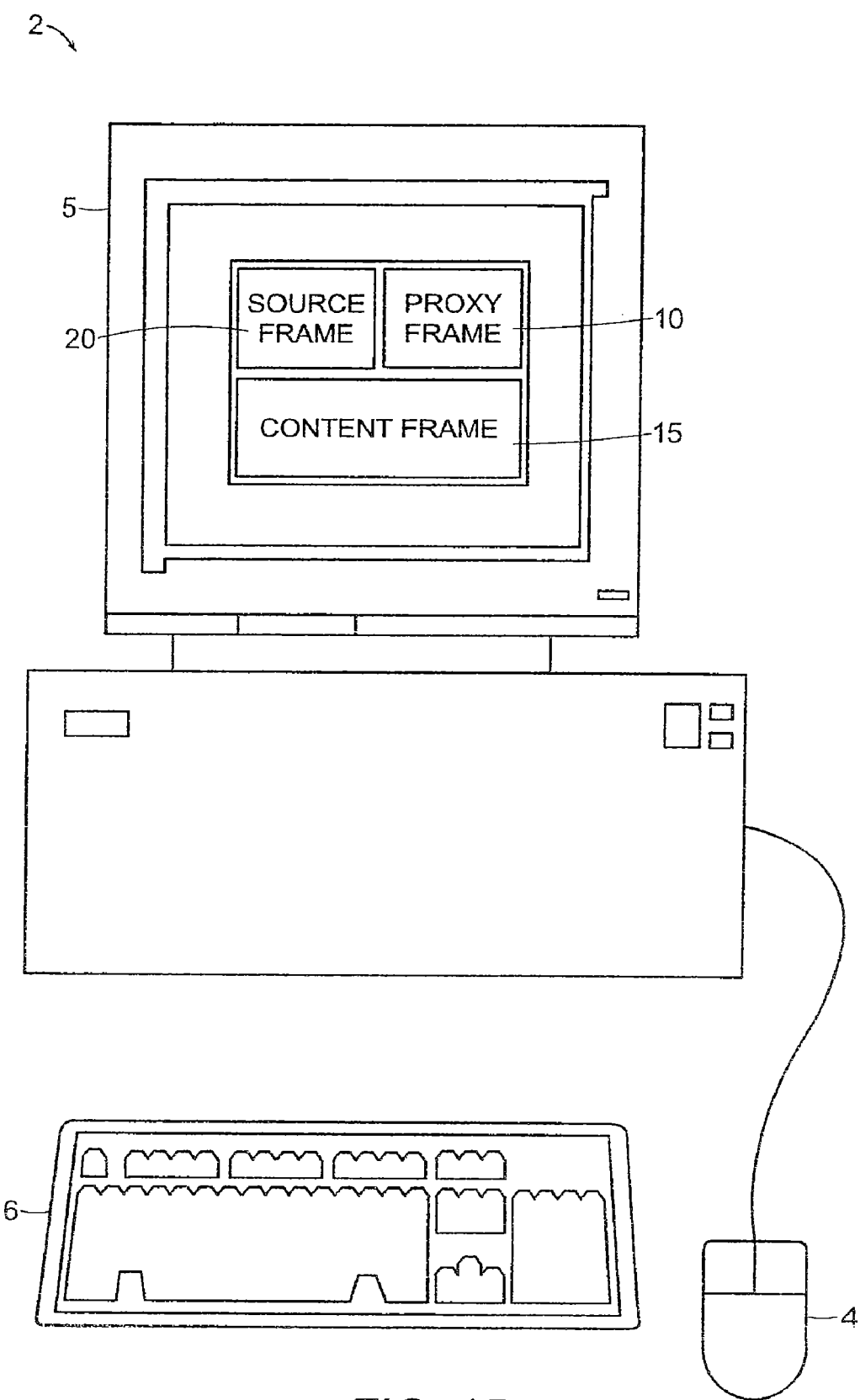
FIG. 15 illustrates a web page implementing the content update proxy method including a source frame according to one embodiment.

FIG. 15 illustrates a web page implementing the content update proxy method including a source frame according to one embodiment. In particular, the Web page as shown is divided into a content frame 15, a proxy frame 10, and a source frame 20.

The source frame 20 may either be hidden from view or may display content that does not change, such as advertising banner graphics. The source frame provides the proxy frame with a number of methods that can be invoked to update the displayed multimedia content of the content frame or the web page in general. The source frame may also include instructions for launching a popup window having information such as advertising promotions. In such an embodiment, the source frame limits network traffic generated between subsequent requests for web pages because the methods for modifying content can be stored for reference by the proxy frame.

Figure 16:
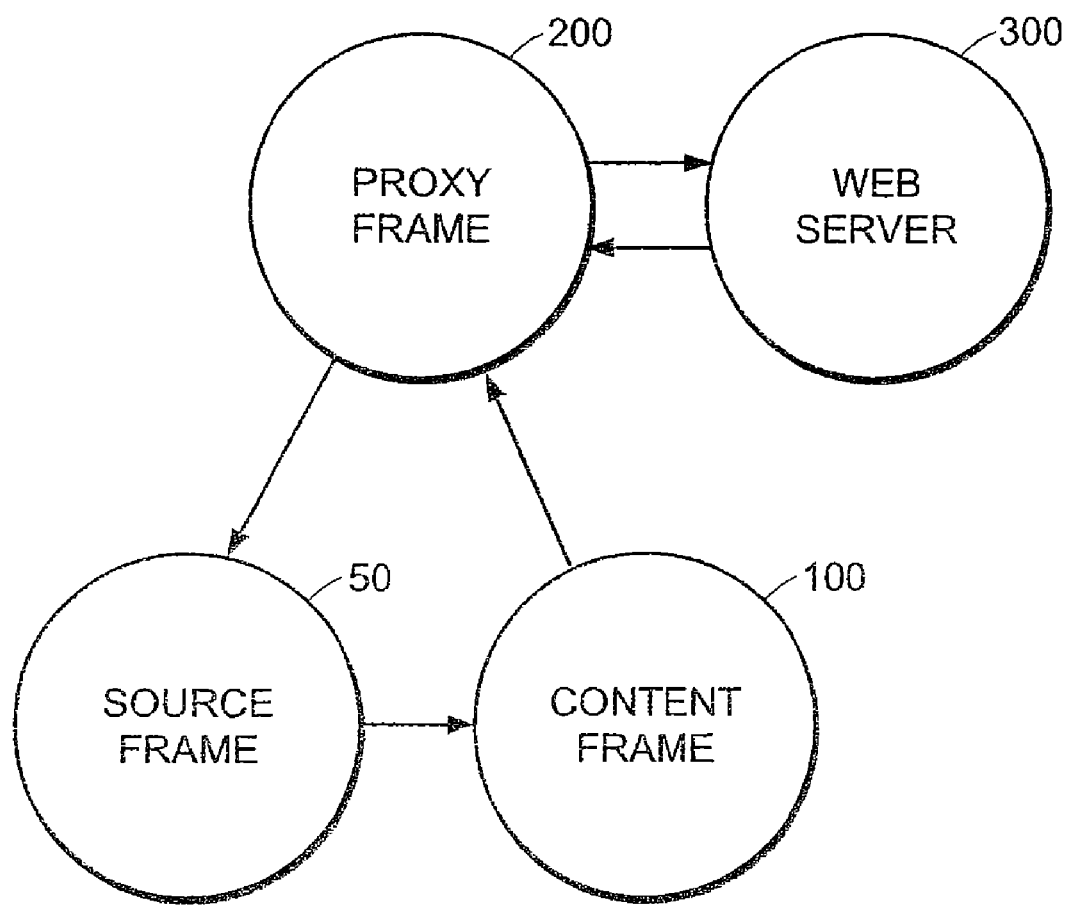
FIG. 16 is a high level object diagram illustrating the flow of communication between a content frame, a proxy frame, a web server, and a source frame.

FIG. 16 is a high level object diagram illustrating the flow of communication between a content frame 100, a proxy frame 200, a web server 300, and a source frame 50. This communication flow, as in FIG. 4, typically occurs in response to an event requiring an update to the displayed multimedia content of the content frame.

The difference between the communication flow diagrams of FIG. 16 and FIG. 4 is that in FIG. 16 the proxy frame 200 may invoke methods defined within the script of the source frame to affect the content of the content frame. In one embodiment, the proxy frame may pass arguments to a method of the same frame that it is invoking. In another embodiment, the displayed content may be modified through a combination of the methods being invoked in the source frame, as well as through direct modification by the proxy frame.

There are several advantages to using a separate source frame as an embodiment of the content update proxy method. By storing content modification methods in a source frame, the source frame can maintain these methods even when the content frame may be reloaded with a different content script. When the user requests a previous page, a proxy script can be generated which simply invokes the appropriate source frame method to generate that page without having to reload the entire content script into the content frame again.

In addition, the source frame may be configured to keep track of historical and state information which would be lost when a new page is loaded into the content frame. Therefore, in the case where the content frame is required to display entirely different page content, its prior state and content values can be maintained for future reference when theat page is requested again. State and historical information may be saved within a form object having form elements that store values. In such an embodiment, the source frame could further limit network traffic by storing the state and historical information, which would typically be stored at the server.

Those of ordinary skill in the art realize that methods involved in a content update proxy method may be embodied in a computer program product that includes a computer-usable medium. For example, such a computer usable medium can include a readable memory device, such as a hard drive device, a CD-ROM, a DVD-ROM, a computer diskette or solid-state memory components (ROM, RAM), having computer readable program code segments stored thereon. The computer readable medium can also include a communications or transmission medium, such as a bus or a communications link, either optical, wired, or wireless, having program code segments carried thereon as digital or analog data signals.

While the system has been particularly shown and described with references to particular embodiments thereof, it will be understood by those skilled in the art that various changes in form and details may be made therein without departing from the scope of the invention encompassed by the appended claims. For example, the methods can be applied to various environments, and are not limited to the environment described herein.

What is claimed is:

1. A method of updating the displayed content of a web page comprising:
   based, at least in part, on a user interaction with the web page, communicating modification instructions to the web page from a server through a proxy frame of the web page, such that the proxy frame communicates with the server on behalf of the web page;
   based on the modification instructions and in response to the user interaction, invoking a proxy method from an event handler of a content frame;
   generating a query string from the proxy method, the query string comprising information for generating a proxy script, the information being provided by the content frame;
   transmitting the query string to the server for the proxy script;
   from the proxy frame:
      loading the proxy script from the server that update content of the web page that is contained outside the proxy frame; and
      updating the content of the web page according to the proxy script, the updating affecting less than the entire web page.

2. The method of claim 1 further comprising, requesting the modification instructions from the server by a frame of the web page invoking a method of the proxy frame that generates and submits the request to the server.

3. The method of claim 2 wherein the frame is a content frame.

4. The method of claim 2 further comprising, receiving the modification instructions from the server in the proxy frame, the modification instructions being represented in a script for updating the content of the web page.

5. The method of claim 4 further comprising executing the script of the proxy frame to update the content of the web page.

6. The method of claim 1 further comprising:
   from the proxy frame, invoking a method of a source frame of the web page for updating the content of the web page; and
   executing the instructions of the source frame method updating the content of the web page.

7. The method of claim 1, further comprising:
   receiving the user interaction.

8. The method of claim 1, wherein the user interaction comprises a mouse click event.

9. The method of claim 1, wherein the web page comprise a cell, and wherein the user interaction comprises the cell losing focus.

10. The method of claim 1, wherein the user interaction comprises text input via a keyboard.

11. A method of updating the displayed content of a web page comprising:
   displaying a web page, the web page including a proxy frame;
   based, at least in part, on a user interaction with the web page, transmitting a request to a server from the proxy frame on behalf of the web page for a proxy script comprising a set of instructions to cause a modification to content of the web page that is contained outside the proxy frame;
   based on the proxy script and in response to the user interaction, invoking a proxy method from an event handler of a content frame;
   generating a query string by the proxy frame from the proxy method;
   transmitting the query string from the server into the proxy frame; and
   executing the query string to update the content of the web page with the modification.

12. The method of claim 11 further comprising loading the proxy script into the proxy frame, wherein the proxy script includes instructions to update the web page with the modification.

13. The method of claim 12 wherein the instructions to update the web page include a command that modifies a property of a content element of the web page.

14. The method of claim 12 wherein the instructions to update the web page include a call to a method in a script of the web page.

15. The method of claim 12 wherein the instructions to update the web page include a command to spawn a new instance of a browser window.

16. The method of claim 12 wherein the instructions to update the web page include a command to redirect a frame of the web page to a new URL.

17. The method of claim 12 wherein the instructions to update the web page include commands to rewrite an entire frame of the web page.

18. The method of claim 12 wherein the instructions to update the web page include commands to store global data in a web page.

19. The method of claim 12 further comprising:
generating the proxy script by a server scripting engine in response to the request transmitted from the proxy frame, the proxy script including instructions that modifies less than the entire region of the web page.

20. The method of claim 11 further comprising:
generating a query string by the proxy frame, the query string comprising information for generating the proxy script, the information being provided by a content frame; and
transmitting the query string in the request to the server for the proxy script.

21. The method of claim 20 further comprising:
invoking an event handler of the content frame in response to an event;
invoking a proxy method from the event handler of the content frame;
generating the query string from the proxy method; and
transmitting the query string to the server.

22. The method of claim 21 wherein the event is triggerable by the user interaction, and wherein the user interaction occurs within the content frame.

23. The method of claim 21 wherein the event is triggerable by a server action.

24. The method of claim 21 wherein the event is triggerable by a timer.

25. The method of claim 21 wherein the event is triggerable by a third party action.

26. The method of claim 11 wherein transmitting the request comprises posting data to the server.

27. The method of claim 26 wherein posting comprises:
generating a form in the proxy frame, the form having a form element for storing a value;
setting the value of the form element with data obtained from the web page; and
submitting the form to the server such that the value of the form element is transmitted to the server.

28. The method of claim 11, further comprising:
receiving the user interaction.

29. The method of claim 11, wherein the user interaction comprises a mouse click event.

30. The method of claim 11, wherein the web page comprise a cell, and wherein the user interaction comprises the cell losing focus.

31. The method of claim 11, wherein the user interaction comprises text input via a keyboard.

32. A computer program product comprising:
a computer readable memory device;
a set of computer program instructions embodied on the computer readable memory device for updating the displayed content of a web page, including instructions to:
based, at least in part, on a user interaction with a web page, communicate modification instructions to the web page from a server through a proxy frame of the web page, such that the proxy frame communicates with the server on behalf of the web page;
based on the modification instructions and in response to the user interaction, invoking a proxy method from an event handler of a content frame;
generate a query string from the proxy method, the query string comprising information for generating a proxy script, the information being provided by the content frame; and
transmit the query string to the server for the proxy script;
from the proxy frame:
load the proxy script from the server that update content of the web page that is contained outside the proxy frame; and
update the content of the web page according to the proxy script, the updating affecting less than the entire web page.

33. The computer program product of claim 32 further including instructions to request the modification instructions from the server by a frame of the web page invoking a method of the proxy frame that generates and submits the request to the server.

34. The computer program product of claim 33 wherein the frame is a content frame.

35. The computer program product of claim 33 further including instructions to receive the modification instructions from the server in the proxy frame, the modification instructions being represented in a script for updating the content of the web page.

36. The computer program product of claim 35 further including instructions to execute the script of the proxy frame to update the content of the web page.

37. The computer program product of claim 32 further including instructions to invoke a method of a source frame of the web page from the proxy frame for updating the content of the web page; and
execute the instructions of the source frame method updating the content of the web page.

38. A computer program product comprising:
a computer readable memory device;
a set of computer program instructions embodied on the computer readable memory device for updating the displayed content of a web page, including instructions to:
display a web page, the web page including a proxy frame;
based, at least in part, on a user interaction with the web page, transmit a request to a server from the proxy frame on behalf of the web page for a proxy script comprising a set of instructions to cause a modification to content of the web page that is contained outside the proxy frame;
based on the proxy script and in response to the user interaction, invoking a proxy method from an event handler of a content frame;
generate a query string by the proxy frame from the proxy method;
transmit the query string from the server into the proxy frame; and
execute the query string to update the content of the web page with the modification.

39. The computer program product of claim 38 further including instructions to load the proxy script into the proxy frame, wherein the proxy script includes instructions to update the web page with the modification.

40. The computer program product of claim 39 wherein the instructions to update the web page include a command that modifies a property of a content element of the web page.

41. The computer program product of claim 39 wherein the instructions to update the web page include a call to a method in a script of the web page.

42. The computer program product of claim 39 wherein the instructions to update the web page include a command to spawn a new instance of a browser window.

43. The computer program product of claim 39 wherein the instructions to update the web page include a command to redirect a frame of the web page to a new URL.

44. The computer program product of claim 39 wherein the instructions to update the web page include commands to rewrite an entire frame of the web page.

45. The computer program product of claim 39 wherein the instructions to update the web page include commands to store global data in the web page.

46. The computer program product of claim 38 further including instructions to generate a query string by the proxy frame, the query string comprising information for generating the proxy script, the information being provided by a content frame; and
transmit the query string in the request to the server for the proxy script.

47. The computer program product of claim 46 further including instructions to invoke an event handler of the content frame in response to an event;
invoke a proxy method from the event handler of the content frame;
generate the query string from the proxy method; and
transmit the query string to the server.

48. The computer program product of claim 47 wherein the event is triggerable by the user interaction, and wherein the user interaction occurs within the content frame.

49. The computer program product of claim 47 wherein the event is triggerable by a server action.

50. The computer program product of claim 47 wherein the event is triggerable by a timer.

51. The computer program product of claim 47 wherein the event is triggerable by a third party action.

52. The computer program product of claim 38 wherein the instructions to transmit the request comprises posting data to the server.

53. The computer program product of claim 52 wherein the posting data to the server comprises instructions to:
generate a form in the proxy frame, the form having a form element for storing a value;
set the value of the form element with data obtained from the web page; and
submit the form to the server such that the value of the form element is transmitted to the server.

54. The computer program product of claim 38 further including instructions to generate the proxy script by a server scripting engine in response to the request transmitted from the proxy frame, the proxy script including instructions that modifies less than the entire region of the web page.

55. A system of updating the displayed content of a web page comprising:
a server having stored modification instructions;
a web page having a proxy frame; and
a modification instruction configured to be communicated from the server to the web page through the proxy frame, in response to a request that is based at least in part on a user interaction with the web page, such that the proxy frame communicates with the server on behalf of the web page;
the modification instruction being configured to invoke a proxy method from an event handler of a content frame, generate a query string from the proxy method, the query string comprising information for generating a proxy script, the information being provided by the content frame, and transmit the query string to the server for the proxy script;
the proxy frame being configured to load the proxy script from the server that updates content of the web page that is contained outside the proxy frame; and
the proxy frame being configured to update the content of the web page according to the proxy script.

56. The system of claim 55 further comprising, a proxy method of the proxy frame, the proxy method generating and submitting requests to the server for modification instructions for a frame of the web page when invoked by a content frame.

57. The system of claim 56 wherein the frame is a content frame.

58. The system of claim 56 further comprising, a proxy script generated by the server, the proxy script including the modification instructions for updating the content of the web page, the proxy script being received in the proxy frame.

59. The system of claim 58 wherein the instructions of the proxy script of the proxy frame is executed to update the web page.

60. The system of claim 55, wherein the web page further comprises:
a source frame including a method having instructions for updating the content of the web page, the source frame method being invoked from the proxy frame, the instructions of the source frame method being executed updating the content of the web page.

61. A system of updating the displayed content of a web page comprising:
a client computer configured to display a web page, the web page including a proxy frame;
the proxy frame being configured to transmit, to a server and on behalf of the web page, a request for a proxy script comprising a set of instructions to cause a modification to content of the web page that is contained outside the proxy frame; wherein:
the proxy frame is configured to transmit the request based, at least in part, on a user interaction with the web page, based on the proxy script and in response to the user interaction, invoke a proxy method from an event handler of a content frame, generate a query string by the proxy frame from the proxy method;
the server is configured to transmit the proxy script into the proxy frame; and
the client computer is configured to update the content of the web page with the modification by executing the proxy script.

62. The system of claim 61 wherein the proxy script is loaded into the proxy frame, the proxy script including instructions to update the web page with the modification.

63. The system of claim 62 wherein the instructions to update the web page include a command that modifies a property of a content element of the web page.

64. The system of claim 62 wherein the instructions to update the web page include a call to a method in a script of the web page.

65. The system of claim 62 wherein the instructions to update the web page include a command to spawn a new instance of a browser window.

66. The system of claim 62 wherein the instructions to update the web page include a command to redirect a frame of the web page to a new URL.

67. The system of claim 62 wherein the instructions to update the web page include commands to rewrite an entire frame of the web page.

68. The system of claim 62 wherein the instructions to update the web page include commands to store global data in the web page.

69. The system of claim 61 further comprising:
a query string, the query string being generated by the proxy frame, the query string comprising information for generating the proxy script, the information being provided by a content frame, the query string being transmitted in the request to the server for the proxy script.

70. The system of claim 69 further comprising:
an event handler of the content frame;
a proxy method;
the proxy method being invoked from the event handler of the content frame, the event handler of the content frame being invoked in response to an event;
the proxy method generating the query string; and
the proxy method transmitting the query string to the server.

71. The system of claim 70 wherein the event is triggerable by the user interaction, and wherein the user interaction occurs within the content frame.

72. The system of claim 70 wherein the event is triggerable by a server action.

73. The system of claim 70 wherein the event is triggerable by a timer.

74. The system of claim 70 wherein the event is triggerable by a third party action.

75. The system of claim 61 wherein the request is transmitted by posting data to the server.

76. The system of claim 75 wherein the proxy frame further comprises:
a form, the form having a form element for storing a value, the value of the form element being set data obtained from the web page, the form being submitted to the server such that the value of the form element is transmitted to the server.

77. The system of claim 61, wherein the server further comprises:
a server scripting engine configured to generate the proxy script in response to the request transmitted from the proxy frame, the proxy script including instructions that modifies less than the entire region of the web page.

* * * * *

UNITED STATES PATENT AND TRADEMARK OFFICE
CERTIFICATE OF CORRECTION

PATENT NO. : 7,464,381 B1 Page 1 of 1
APPLICATION NO. : 09/570276
DATED : December 9, 2008
INVENTOR(S) : Nickerson et al.

It is certified that error appears in the above-identified patent and that said Letters Patent is hereby corrected as shown below:

On the Title page, in Item (56), in column 2, under "Other Publications", line 1, delete "mircosoft" and insert -- microsoft --, therefor.

In column 15, line 18, delete "theat" and insert -- the --, therefor.

Signed and Sealed this

Twenty-seventh Day of April, 2010

David J. Kappos
*Director of the United States Patent and Trademark Office*